(12) United States Patent
Goto et al.

(10) Patent No.: US 9,632,318 B2
(45) Date of Patent: Apr. 25, 2017

(54) HEAD-MOUNTED DISPLAY INCLUDING AN OPERATING ELEMENT HAVING A LONGITUDINAL DIRECTION IN A DIRECTION OF A FIRST AXIS, DISPLAY APPARATUS, AND INPUT APPARATUS

(71) Applicant: Sony Corporation, Tokyo (JP)

(72) Inventors: Tetsuro Goto, Tokyo (JP); Masatoshi Ueno, Kanagawa (JP); Kenichi Kabasawa, Saitama (JP); Toshiyuki Nakagawa, Kanagawa (JP); Daisuke Kawakami, Kanagawa (JP); Shinobu Kuriya, Kanagawa (JP); Tsubasa Tsukahara, Tokyo (JP); Hisako Sugano, Kanagawa (JP); Hirotaka Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 69 days.

(21) Appl. No.: 14/153,908

(22) Filed: Jan. 13, 2014

(65) Prior Publication Data

US 2014/0204062 A1 Jul. 24, 2014

(30) Foreign Application Priority Data

Jan. 23, 2013 (JP) ................................. 2013-010112

(51) Int. Cl.
*G06F 3/033* (2013.01)
*G02B 27/01* (2006.01)
(Continued)

(52) U.S. Cl.
CPC ....... *G02B 27/0176* (2013.01); *G02B 27/017* (2013.01); *G06F 1/169* (2013.01);
(Continued)

(58) Field of Classification Search
None
See application file for complete search history.

(56) References Cited

U.S. PATENT DOCUMENTS 6,002,389 A * 12/1999 Kasser .................... G06F 3/041
178/18.01
2005/0083307 A1* 4/2005 Aufderheide et al. ........ 345/173
(Continued)

FOREIGN PATENT DOCUMENTS

EP 2685358 A1 * 1/2014
JP 2008-070817 3/2008
JP 2008070817 A * 3/2008

OTHER PUBLICATIONS

Lliaifar, Mobility and Milestones: 2012 BMW Connecteddrive System Adds 3D Maps, Touchpad and 4G LTE Hotspot, Jul. 11, 2012, located at http://www.digitaltrends.com/cars/mobility-and-milestones-2012-bmw-connecteddrive-system-adds-3d-maps-touchpad-and-4g-lte-hotspot/.*

*Primary Examiner* — Ilana Spar
*Assistant Examiner* — Kirk Hermann
(74) *Attorney, Agent, or Firm* — Chip Law Group

(57) ABSTRACT

A head-mounted display includes a main body and an input operation unit. The main body includes a display unit configured to be capable of presenting an image to a user, and is configured to be mountable on a head of the user. The input operation unit includes an operating element having a longitudinal direction in a direction of a first axis, is configured to be capable of electrostatically detecting a first operation on the operating element along the direction of the first axis and detecting a second operation on the operating element along a direction of a second axis orthogonal to the direction of the first axis, and is provided to the main body.

11 Claims, 15 Drawing Sheets

(51) Int. Cl.
*G06F 1/16* (2006.01)
*G06F 3/0338* (2013.01)
*G06F 3/0362* (2013.01)

(52) U.S. Cl.
CPC .......... *G06F 3/0338* (2013.01); *G06F 3/0362* (2013.01); *G02B 2027/0178* (2013.01); *G02B 2027/0187* (2013.01)

(56) References Cited

U.S. PATENT DOCUMENTS

| | | | | |
|---|---|---|---|---|
| 2007/0040812 | A1* | 2/2007 | Tang ................... | H04M 1/2535 345/173 |
| 2012/0096351 | A1* | 4/2012 | Shahoian ............... | G06F 3/016 715/702 |
| 2012/0126640 | A1* | 5/2012 | Bleckmann et al. ........... | 310/48 |
| 2012/0299870 | A1* | 11/2012 | Chi ..................... | G02B 27/017 345/174 |
| 2012/0306765 | A1* | 12/2012 | Moore .................... | G06F 3/041 345/173 |
| 2013/0082970 | A1* | 4/2013 | Frey et al. .................... | 345/173 |
| 2013/0220779 | A1* | 8/2013 | Kerner et al. .................... | 200/4 |
| 2014/0107924 | A1* | 4/2014 | Tava ............................. | 701/533 |

* cited by examiner

HEAD-MOUNTED DISPLAY INCLUDING AN OPERATING ELEMENT HAVING A LONGITUDINAL DIRECTION IN A DIRECTION OF A FIRST AXIS, DISPLAY APPARATUS, AND INPUT APPARATUS

CROSS REFERENCES TO RELATED APPLICATIONS

The present application claims priority to Japanese Priority Patent Application JP 2013-010112 filed in the Japan Patent Office on Jan. 23, 2013, the entire content of which is hereby incorporated by reference.

BACKGROUND

The present disclosure relates to a head-mounted display, a display apparatus, and an input apparatus.

There is known a head-mounted display (HMD) that is mounted on the head of the user and capable of presenting an image to a user through a display or the like situated in front of the eyes. The control of a display image in the HMD is performed by, in general, a depress operation or the like of a button provided to the HMD or a dedicated input apparatus or the like connected to the HMD (see Japanese Patent Application Laid-open No. 2008-070817).

SUMMARY

However, in the case where the dedicated input apparatus or the like is used to perform an input operation, it is necessary to carry the input apparatus or the like together with the HMD, which is disadvantageous in view of the portability. Further, in the case where the HMD is provided with the button or the like as the input apparatus, as the number of buttons or the like that can be provided increases, the variations of the input operation decrease. At the same time, an occupation area of the buttons or the like increases, which may affect the design of the HMD. In addition, in the case of using the button or the like, it may be impossible to perform a two-dimensional input operation, and hence to perform a wide variety of input operations that match the intuition of the user.

In the above-mentioned circumstances, it is desirable to provide a head-mounted display, a display apparatus, and an input apparatus that include an input operation unit space-saving and excellent in operability.

According to an embodiment of the present disclosure, there is a head-mounted display including a main body and an input operation unit.

The main body includes a display unit configured to be capable of presenting an image to a user, and is configured to be mountable on a head of the user.

The input operation unit includes an operating element having a longitudinal direction in a direction of a first axis, is configured to be capable of electrostatically detecting a first operation on the operating element along the direction of the first axis and detecting a second operation on the operating element along a direction of a second axis orthogonal to the direction of the first axis, and is provided to the main body.

The head-mounted display (HMD) is capable of individually detecting the first operation and the second operation on the operating element having the longitudinal direction in the direction of the first axis. This enables the HMD to perform a two-dimensional operation even in the case where it may be impossible to ensure a sufficient space in the direction of the second axis. Further, at least with respect to the direction of the first axis, the first operation is electrostatically detected. Therefore, it is possible to provide an operational feeling similar to that of a two-dimensional capacitive touch sensor, and hence a configuration easy for the user to perform an input operation can be achieved. Therefore, the HMD can be configured to include the input operation unit space-saving and excellent in operability.

Specifically, the input operation unit may further include
  a first detection element configured to electrostatically detect the first operation, and
  a second detection element configured to detect the second operation.

With this, the first operation and the second operation can be detected using the different detection elements.

The operating element may include a rotor that extends in the direction of the first axis and is configured to be rotatable around the first axis,
  the first detection element may be provided on the rotor, and
  the second detection element may be configured to detect the second operation based on a rotation of the rotor.

This makes it possible to detect the second operation based on the rotation of the rotor with respect to the direction of the second axis. Even in the case where it may be impossible to ensure a sufficient space in the direction of the second axis, it becomes possible to infinitely ensure an operation area with respect to the direction of the second axis.

Alternatively, the operating element may be configured to be strainable, and
  the second detection element may be configured to detect the second operation based on a strain of the operating element.

This makes it possible to perform an input operation also with respect to the direction of the second axis by moving the detection target while being held in contact with the operating element. Therefore, it is possible to provide an operational feeling more similar to that of the two-dimensional touch sensor.

Specifically, the operating element may be an elastic member,
  the first detection element may be provided to the elastic member, and
  the second detection element may include a plurality of strain sensors that are provided to the elastic member and arranged along the direction of the second axis.

This enables the operating element to have a relatively simple and compact configuration.

Further, specifically, the main body may further include an operation area in which the first detection element is provided,
  the operating element may include a beam portion including
    a first end portion that is supported by the operation area, and
    a second end portion configured to be bendable in the direction of the second axis, and
  the second detection element may be configured to detect the second operation based on a bending amount of the beam portion.

This makes it possible to perform an input operation in the direction of the second axis by bending the beam portion. Therefore, it is possible to perform a more intuitive input operation.

The input operation unit may further include a control unit configured to control the image based on an output of the first detection element and an output of the second detection element.

With this, as in the two-dimensional touch sensor, the mouse, or the like, it becomes possible to perform a wide variety of input operations such as a selection operation of a plurality of GUIs arranged in a display image, and hence to enhance the operability.

The main body may further include a support unit that extends in the direction of the first axis and is mounted on a temporal region of the head of the user, and the display unit and the operating element may be supported by the support unit.

With this, even in the case where the HMD is a see-through type, it is possible to perform an input operation without interfering with image display. Further, in general, a temple unit is provided at a position of the hand of the user when the user wearing the HMD crooks the arm upwards. Therefore, the user can perform an input operation in a comfortable position.

According to another embodiment of the present disclosure, there is provided a display apparatus including a main body and an input operation unit.

The main body is configured to be capable of displaying an image.

The input operation unit includes an operating element having a longitudinal direction in a direction of a first axis, is configured to be capable of electrostatically detecting an operation on the operating element along the direction of the first axis and detecting an operation on the operating element along a direction of a second axis orthogonal to the direction of the first axis, and is provided to the main body.

This enables the display apparatus to detect the first operation and the second operation even in the case where it may be impossible to ensure a sufficient space in the direction of the second axis, and hence the two-dimensional operation can be performed. Further, the first operation can be electrostatically detected with respect to the direction of the first axis, and hence it is possible to provide an operational feeling similar to that of a two-dimensional capacitive touch sensor.

For example, the main body may include a casing including a marginal portion that extends in the direction of the first axis, and the operating element may be provided along the marginal portion.

With this, the operating element can be provided utilizing, for example, the marginal portion formed between two adjacent surfaces of the casing. Therefore, a small space can be effectively used.

According to still another embodiment of the present disclosure, there is provided an input apparatus including a casing and an input operation unit.

The casing has a longitudinal direction in a direction of a first axis.

The input operation unit includes an operating element having a longitudinal direction in a direction of a first axis, is configured to be capable of electrostatically detecting an operation on the operating element along the direction of the first axis and detecting an operation on the operating element along a direction of a second axis orthogonal to the direction of the first axis, and is provided to the casing.

With this, in the case of the input apparatus including the casing having a small and elongated shape, for example, a configuration capable of performing the two-dimensional operation can be achieved.

As in the above, according to the embodiments of the present disclosure, it is possible to provide a head-mounted display, a display apparatus, and an input apparatus that include an input operation unit space-saving and excellent in operability.

These and other objects, features and advantages of the present disclosure will become more apparent in light of the following detailed description of best mode embodiments thereof, as illustrated in the accompanying drawings.

Additional features and advantages are described herein, and will be apparent from the following Detailed Description and the figures.

DETAILED DESCRIPTION

Hereinafter, embodiments of the present disclosure will be described with reference to the drawings.

First Embodiment

Head-Mounted Display

Figure 1:
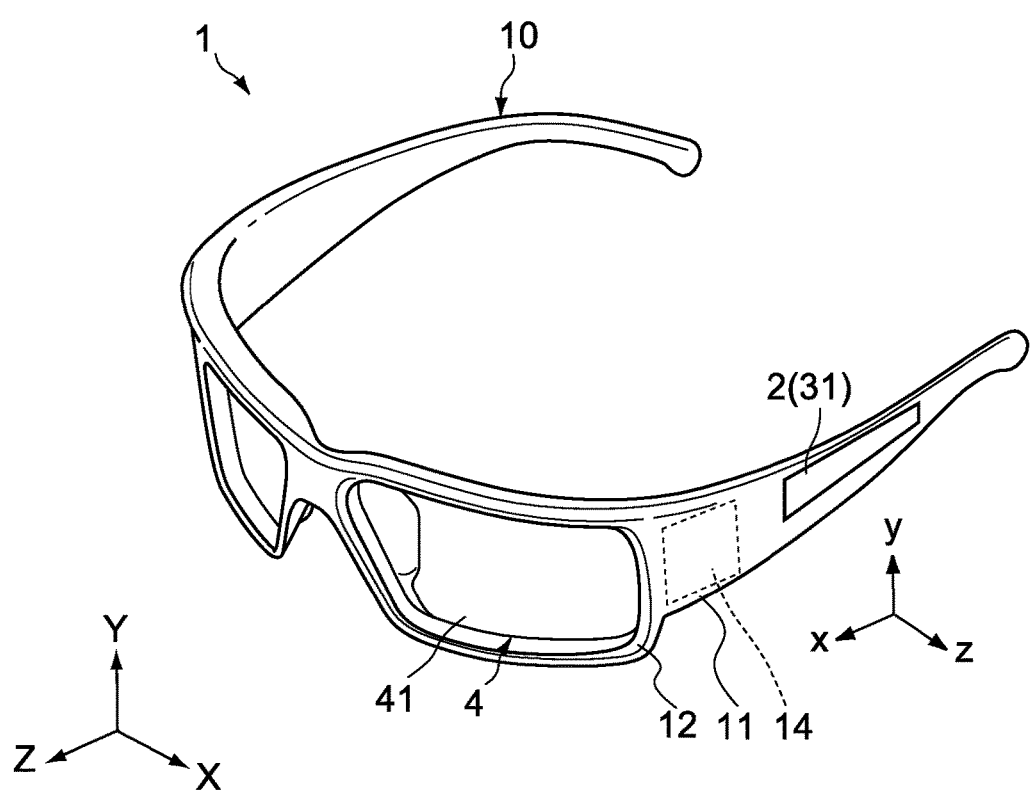
FIG. 1 is a schematic perspective view showing a head-mounted display (HMD) according to a first embodiment of the present disclosure.
Figure 2:
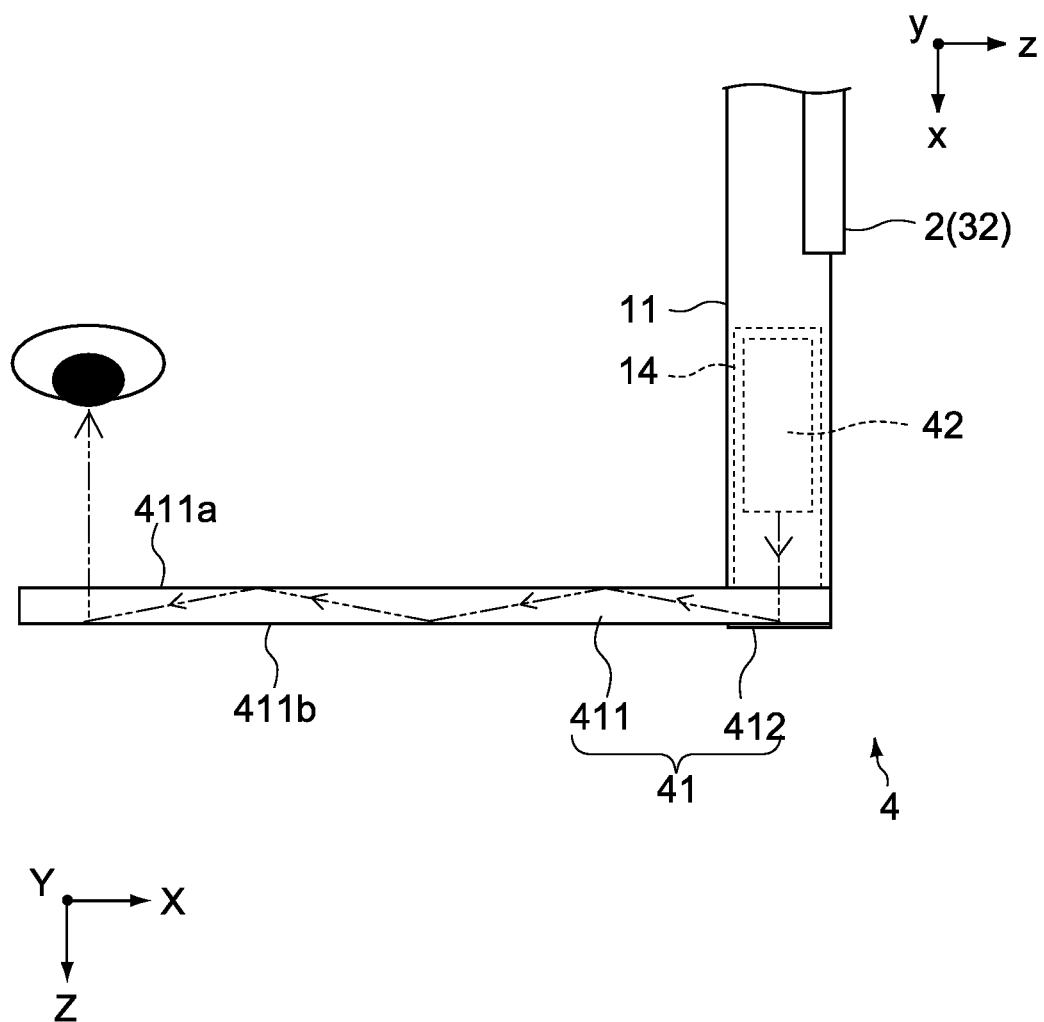
FIG. 2 is a main-part plan view of the HMD shown in FIG. 1.
Figure 3:
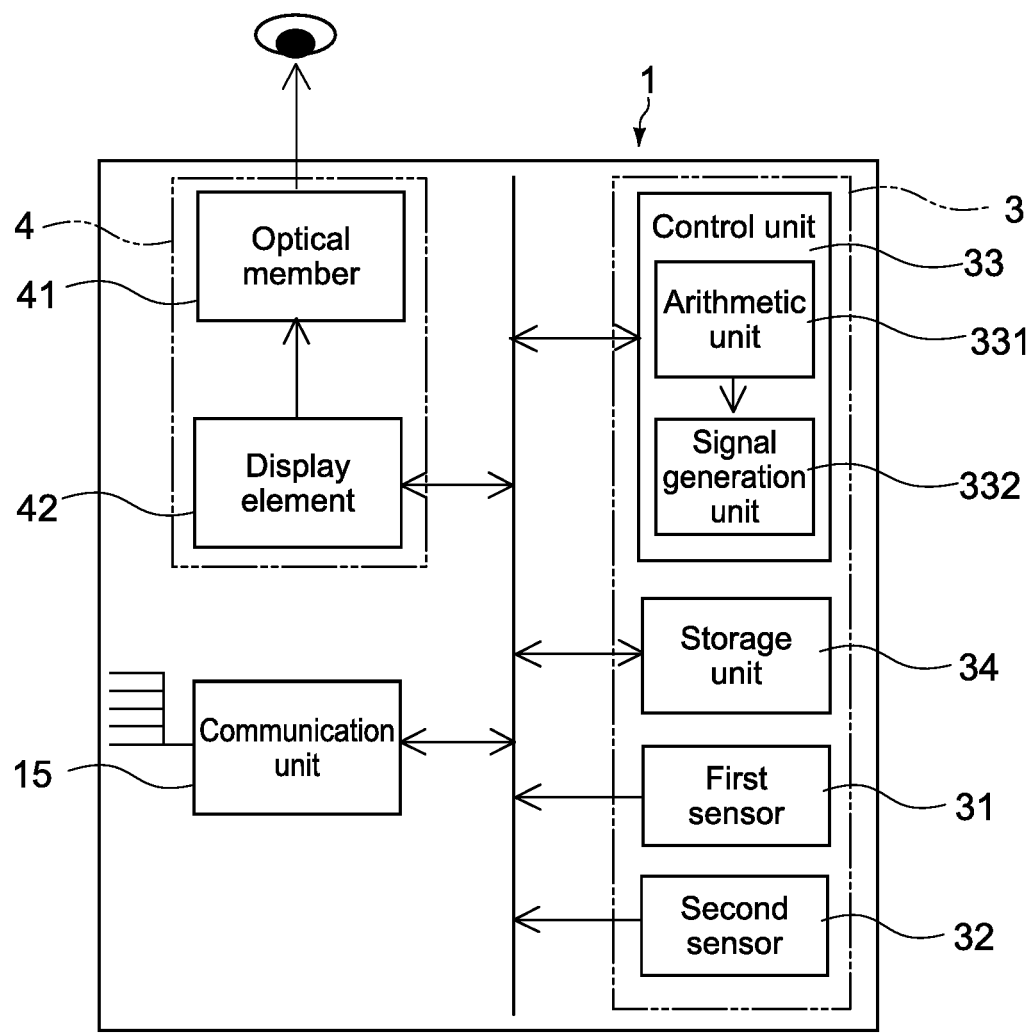
FIG. 3 is a block diagram showing an internal configuration of the HMD shown in FIG. 1.

FIGS. 1, 2, and 3 are schematic views showing a head-mounted display (HMD) according to an embodiment of the present disclosure. FIG. 1 is a perspective view, FIG. 2 is a main-part plan view, and FIG. 3 is a block diagram showing an internal configuration.

Note that an X-axis direction and a Y-axis direction in the figures indicate directions almost orthogonal to each other, and indicate directions parallel to a display surface on which an image is displayed to a user in this embodiment. A Z-axis direction indicates a direction orthogonal to the X-axis direction and the Y-axis direction. The X-axis direction indicates left- and right-hand directions of an HMD 1 when the HMD is worn. The Y-axis direction indicates upper and lower directions (vertical direction) of the HMD 1 when the HMD is worn.

Further, an x-axis direction, a y-axis direction, and a z-axis direction in the figures indicate three axis directions orthogonal to one another. The x-axis direction, the y-axis direction, and the z-axis direction correspond to the Z-axis direction, the Y-axis direction, and the X-axis direction, respectively. In this embodiment, a direction of a first axis corresponds to the x-axis direction (Z-axis direction) and a direction of a second axis corresponds to the y-axis direction (Y-axis direction).

The HMD 1 includes a main body 10 and an input operation unit 3. In this embodiment, the HMD 1 is configured as a see-through type HMD. The HMD 1 has a glasses-form as a whole. The HMD 1 is configured to be capable of presenting an image based on information input through the input operation unit 3 to the user while the user who wears the HMD1 on the head is viewing an outside.

Note that the main body 10 of the HMD 1 includes, as will be described later, two display units 4 configured corresponding to left and right eyes. Those display units 4 have almost the same configuration. Therefore, in the figures and the following descriptions, common components of the two display units 4 will be denoted by the same reference symbols.

[Main Body]

The main body 10 includes support units (temple units) 11, rim units 12, and the display units 4. The main body 10 is configured to be mountable on the head of the user. Each of the display units 4 is configured to be capable of presenting an image to the user. Each of the temple units 11 is configured to support the display unit 4 via the rim unit 12.

The temple units 11 are configured to be capable of engaging end portions thereof with the ears of the user. The temple units 11 are mounted on the temporal regions of the user. Further, the rim units 12 support rims of optical members 41 of the display units 4. The temple units 11 and the rim units 12 are formed of, for example, synthetic resin or metal.

In this embodiment, the temple units 11 extend with the Z-axis direction being a longitudinal direction. Further, the temple unit 11 includes, as will be described later, a groove portion 13 extending in the Z-axis direction and having a semi-circular cylindrical shape (see FIG. 4). The groove portion 13 is configured to be capable of receiving part of a rotor 2 to be described later. In this embodiment, the groove portion 13 is formed in the temple unit 11 mounted on a left-hand side of the user when the HMD is worn. Further, in the case where the rotor(s) 2 to be described later is/are provided on the right-hand side or the both sides of the user, the groove portion 13 may be formed in the temple unit 11 on the right-hand side or both the temple units 11 depending on the position of the rotor 2.

Note that the temple units 11 and the rim units 12 include the two temple units 11 and the two rim units 12 that are configured corresponding to the left and right temporal regions and the left and right eyes of the user. The two temple units 11 and the two rim units 12 respectively have the same configurations. In the figures and the following descriptions, the two temple units 11 and the two rim units 12 will be respectively denoted by the same reference symbols.

In this embodiment, the temple unit 11 may include a housing portion 14. The housing portion 14 is an inner space formed to be capable of housing display elements 42 and the like of the display units 4. The housing portion 14 is formed in, for example, an area of the temple unit 11, which is adjacent to the rim unit 12.

Further, the main body 10 may include earphones attached to the temple units 11 (not shown). This enables the user to enjoy audio together with images. In addition, the main body 10 may further include a nose pad (not shown) attached between the two rim units 12. This makes it possible to improve the wearing comfort of the user.

(Display Unit)

FIG. 2 is a schematic plan view schematically showing a configuration of the display unit 4. The display unit 4 includes the optical member 41 and the display element 42. In the display unit 4, the display element 42 housed in the housing portion 14 of the temple unit 11 forms an image. Then, image light thereof is guided into the optical member 41 and emitted to the eye of the user. In this manner, the image is provided to the user.

In this embodiment, the display element 42 is formed of, for example, a liquid-crystal display (LCD) element. The display element 42 includes a plurality of pixels arranged in a matrix form. The display element 42 includes a light source (not shown) formed of a light-emitting diode (LED) or the like. The display element 42 modulates light input from the light source for each pixel according to an image control signal generated by the input operation unit 3, and emits light that forms an image to be presented to the user. The display element 42 may also use, for example, a three-plate system individually emitting image light beams corresponding to the colors of R (red), G (green), and B (blue) or a single-plate system concurrently emitting image light beams corresponding to those colors.

The display element 42 is, for example, configured to emit image light in the Z-axis direction. Alternatively, depending on needs, an optical system such as a lens may be provided to cause the optical member 41 to emit image light output from the display element 42, in a desired direction.

In this embodiment, the optical member 41 includes a light guide plate 411 and a deflection element (holographic diffraction grating) 412. The optical member 41 is provided to be opposed to the display element 42 in the Z-axis direction.

The light guide plate 411 presents a screen via a display surface 411a from which image light is emitted, the screen having a horizontal direction in the X-axis direction and a vertical direction in the Y-axis direction. The light guide plate 411 is configured as, for example, a translucent plate including the display surface 411a having an XY plane almost orthogonal to the Z-axis direction and an outer surface 411b opposed to the display surface 411a. When the HMD is worn, the light guide plates 411 are arranged like lenses of glasses in front of the user, for example. The material of the light guide plate 411 may be appropriately employed in view of reflectance or the like. For example, a light-transmissive material such as a transparent plastic plate of polycarbonate resin, polyethylene terephthalate (PET), or the like, a glass plate, and a ceramic plate is employed.

The holographic diffraction grating 412 has a film-like structure made of, for example, photopolymer material. The holographic diffraction grating 412 is provided on the outer surface 411b to be opposed to the display element 42 in the Z-axis direction. The holographic diffraction grating 412 is formed as a non-see-through type in this embodiment. However, the holographic diffraction grating 412 may be formed as a see-through type.

The holographic diffraction grating 412 is capable of efficiently reflecting light having a particular wavelength band at an optimal diffraction angle. For example, the holographic diffraction grating 412 is configured to diffract and reflect light having a particular wavelength band that is emitted from the Z-axis direction, in a direction such that the light is totally reflected within the light guide plate 411, and to cause the light to be emitted from the display surface 411a toward the eye of the user. Specifically, wavelength bands corresponding to the colors of R (red), G (green), and B (blue) are selected as the particular wavelength bands. With this, the image light beams corresponding to the colors that are emitted from the display element 42 individually travel within the light guide plate 411 and are emitted from the display surface 411a. Those image light beams of the colors are input into the eye of the user. In this manner, a predetermined image can be presented to the user. Note that, for the sake of description, only one light beam having a wavelength band is shown in FIG. 2.

A holographic diffraction grating separate from the holographic diffraction grating 412 may also be provided at a position on the outer surface 411b, which is opposed to the eye of the user. This makes it easy to cause the image light to be emitted from the display surface 411a toward the eye of the user. In this case, for example, by forming this holographic diffraction grating as a see-through type holographic diffraction grating or the like, the configuration as the see-through type HMD can be maintained.

[Input Operation Unit]

Figure 4:
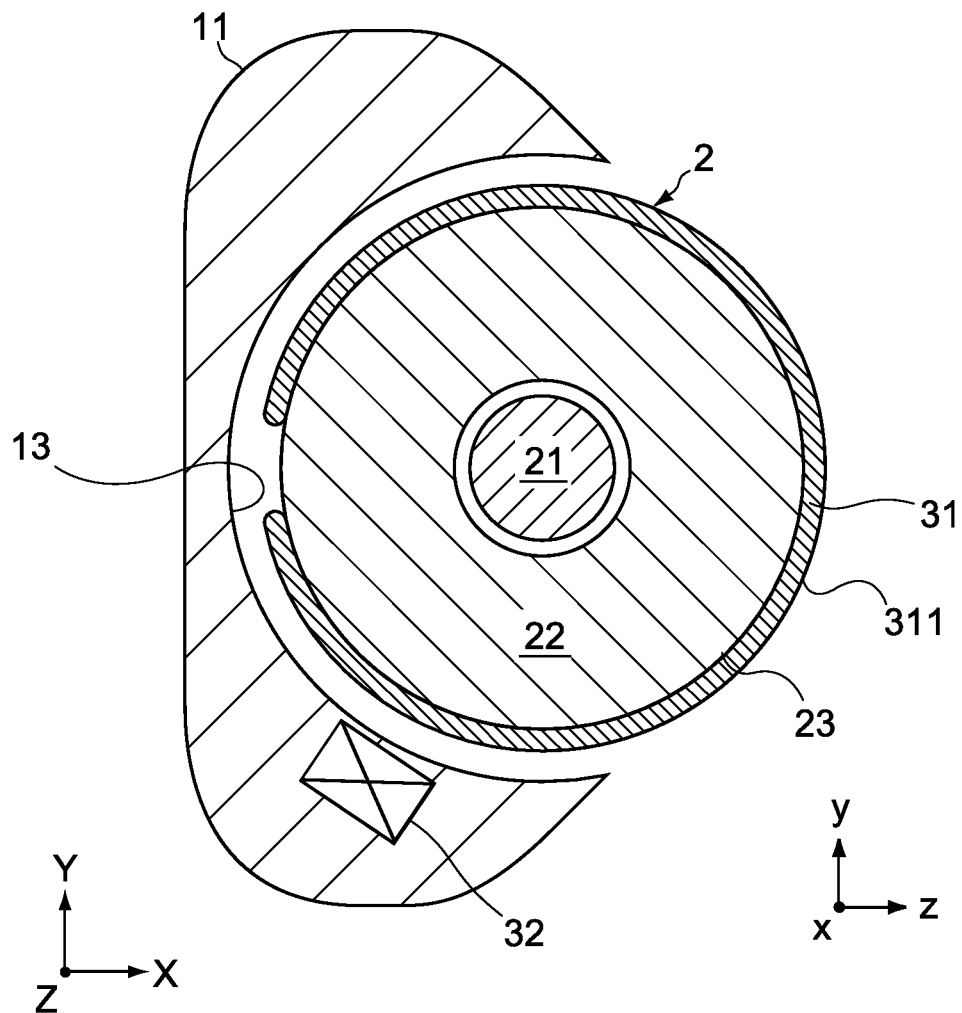
FIG. 4 is a view showing a configuration of a rotor shown in FIG. 1, which is a schematic cross-sectional view as viewed from a Z-axis direction.

FIG. 4 is a view showing a configuration of the input operation unit, which is a schematic cross-sectional view as viewed from the Z-axis direction (x-axis direction). In this embodiment, the input operation unit 3 includes a rotor (operating element) 2, a first sensor (first detection element) 31, a second sensor (second detection element) 32, a control unit 33, and a storage unit 34. The input operation unit 3 configured to be capable of controlling an image to be presented to the user realizes two-dimensional input operations in the x-axis direction and the y-axis direction.

The rotor 2 is configured to be rotatable around an x-axis. The rotor 2 is formed in a cylindrical shape with the x-axis direction being a height direction and the y-axis direction being a radical direction. That is, the rotor 2 has a longitudinal direction in the x-axis direction and configured as a wide jog dial rotatable around the x-axis. Further, in this embodiment, the rotor 2 is provided in the groove portion 13 of the temple unit 11 mounted on the left-hand side of the user when the HMD is worn. The rotor 2 is not limited thereto and the rotor(s) 2 may be provided to the temple unit 11 on the right-hand side or to the temple units 11 on the both sides.

The rotor 2 includes a shaft portion 21 and a rotating portion 22. The shaft portion 21 extends in the x-axis direction and provided in the center of the rotor 2. The shaft portion 21 may be inserted into an end surface of the above-mentioned groove portion 13 and fixed. The rotating portion 22 is formed in a cylindrical shape and provided around the shaft portion 21. The rotating portion 22 is configured to be rotatable around the x-axis. Further, the shaft portion 21 and the rotating portion 22 are made of, for example, insulating material.

Note that the rotor 2 may include a base member (not shown) that supports the shaft portion 21 and provided in the groove portion 13. This makes it possible to more stably support the rotor 2. In this case, the shaft portion 21 of the rotor 2 may be fixed to the base member. The shape of the base member is not particularly limited and is, for example, formed in a semi-spherical shape that is fitted into the groove portion 13. Further, the material of the base member is not also particularly limited and is, for example, made of insulating material.

The first sensor 31 is provided on a rotating surface 23 of the rotor 2. The first sensor 31 electrostatically detects a first operation along the x-axis direction. In this embodiment, it is assumed that the "first operation" is, for example, an operation in which a detection target moves along the x-axis direction while being held in contact with the rotor 2. Further, in this embodiment, it is assumed that the "detection target" is a finger of the user. However, the "detection target" may be a conductor such as a stylus. Further, it is assumed that the first sensor 31 "detecting the first operation" includes the first sensor 31 outputting an electrical signal of a capacitance change or the like to the control unit 33.

Specifically, the first sensor 31 is configured as a one-dimensional projected capacitive sensor. The first sensor 31 is provided on the rotating surface 23 so as to cover almost an entire surface of the rotating surface 23. The first sensor 31 may be formed in, for example, an almost-rectangular sheet shape having flexibility and may adhere onto the rotating surface 23 with an adhesive or the like. This enables the first sensor 31 to rotate around the shaft portion 21 together with the rotating portion 22.

The first sensor 31 includes an operation surface 311 and a plurality of electrodes (slider electrodes) for detecting an x-position, which are not shown in the figure. The slider electrodes are arranged at predetermined intervals in the x-axis direction and along a peripheral direction of the rotor 2 around the x-axis. The operation surface 311 is formed of, for example, an insulating cover film made of plastic resin or the like. The operation surface 311 is provided on the slider electrodes.

The second sensor 32 detects a second operation based on a rotation of the rotor 2 around the x-axis. In this embodiment, it is assumed that the "second operation" is an operation in which the detection target rotates the rotor 2 around the x-axis. Further, it is assumed that "detecting the second operation" includes outputting an electrical signal based on the second operation to the control unit 33.

The configuration of the second sensor 32 is not particularly limited and may be, for example, an optical rotary encoder, a magnetic rotary encoder, or a rotary encoder using another system.

The control unit 33 controls, based on outputs of the first sensor 31 and the second sensor 32, an image to be presented to the user. That is, the control unit 33 is configured to be capable of controlling, according to the first operation and the second operation, a position or the like of a pointer to be displayed in an image, for example.

The control unit 33 is configured by, typically, a central processing unit (CPU) or a micro-processing unit (MPU). In this embodiment, the control unit 33 includes an arithmetic unit 331 and a signal generation unit 332. The control unit 33 performs various functions according to a program stored in the storage unit 34. Further, the control unit 33 includes driving circuits for driving the first sensor 31 and the second sensor 32. In this embodiment, those driving circuits are incorporated in the arithmetic unit 331.

The arithmetic unit 331 calculates, based on the output of the first sensor 31, a displacement amount of an x-coordinate value of the detection target within a minute period of time. Further, the arithmetic unit 331 is capable of updating the x-coordinate value by integrating the displacement amount of the x-coordinate value.

On the other hand, the arithmetic unit 331 calculates, based on an output from the second sensor 32, a rotation amount of the rotor 2 within a minute period of time. In addition, the arithmetic unit 331 converts the rotation amount into a displacement amount of a y-coordinate value. Further, similar to the x-coordinate value, the y-coordinate value can be updated by integrating the displacement amount of the y-coordinate value. Hereinafter, a point corresponding to an xy-coordinate value calculated by the arithmetic unit 331 will be referred to as a detection position.

Based on the detection position, the signal generation unit 332 generates an image control signal for controlling the position of the pointer to be displayed on the screen. On the screen, an XY-coordinate corresponding to a point on xy-coordinates on a one-to-one basis is virtually assigned. Therefore, the pointer is displayed at, for example, a point on the XY-coordinates that corresponds to the detection position. Hereinafter, a point on the XY-coordinates that corresponds to the detection position will be referred to as a display position. The signal generation unit 332 is capable of generating, according to the image control signal, for example, an image in which a pointer or the like is displayed in an overlapping manner at the display position on a menu selection image in which a GUI or the like is displayed.

The signal generation unit 332 outputs the generated image control signal to each of the two display elements 42. Further, the signal generation unit 332 may generate the image control signal corresponding to the left and right eyes. This makes it possible to present a thee-dimensional image to the user.

In addition, in this embodiment, when continuous operations of contact and non-contact are detected within a predetermined period of time (hereinafter, will be referred to as "tap operation") on the operation surface 311, the control unit 33 performs particular processing assigned to a GUI (indicated item) corresponding to the display position. Those processing results by the arithmetic unit 331 are transmitted to the signal generation unit 332.

Further, although not shown in the drawings, the HMD 1 includes an A/D converter that converts electrical signals (analog signals) output from a first sensor 31 and a second sensor 32, into digital signals and a D/A converter that converts the digital signals into the analog signals.

The storage unit 34 is constituted of a random access memory (RAM), a read only memory (ROM), another semi-conductor memory, and the like. The storage unit 34 stores programs or the like to be used in various arithmetic operations by the control unit 33. For example, the ROM is constituted of a non-volatile memory and stores programs and setting values for causing the control unit 33 to perform arithmetic processing such as calculation of an xy-coordinate value of an operation position. The RAM stores the calculated xy-coordinate value of the detection position or the like. Further, the storage unit 34 is enabled by, for example, a non-volatile semi-conductor memory to store programs or the like for performing functions assigned corresponding to them. In addition, those programs stored in the semi-conductor memory or the like in advance may be loaded into the RAM and executed by the arithmetic unit 331 of the control unit 33.

Note that the control unit 33 and the storage unit 34 may be, for example, housed in the housing portion 14 of the temple unit 11 together with the display element 42 or may be housed in a different casing. In the case where the control unit 33 and the storage unit 34 are housed in the different casing, the control unit 33 is configured to be connectable to the first sensor 31 and the second sensor 32, the display units 4, and the like in a wired manner or a wireless manner.

In addition, the HMD 1 may include a communication unit 15. Thus, an image to be presented to the user by the HMD 1 can be obtained from the Internet or the like via the communication unit 15. The communication unit 15 may be housed in the housing portion 14.

Further, the HMD 1 may include a battery (not shown). The battery constitutes a power source of the HMD 1 and supplies a necessary power to each unit within the HMD 1. The battery is a primary battery or a secondary battery.

In addition, the HMD 1 may include a speaker (not shown). The speaker may be configured to convert an electrical audio signal generated by the control unit 33 into a physical vibration and provide audio to the user through the earphones (not shown). Note that the specific configuration of the speaker is not particularly limited.

Next, a basic operation example of the HMD 1 will be described.

[Operation Example of HMD]

Figure 5:
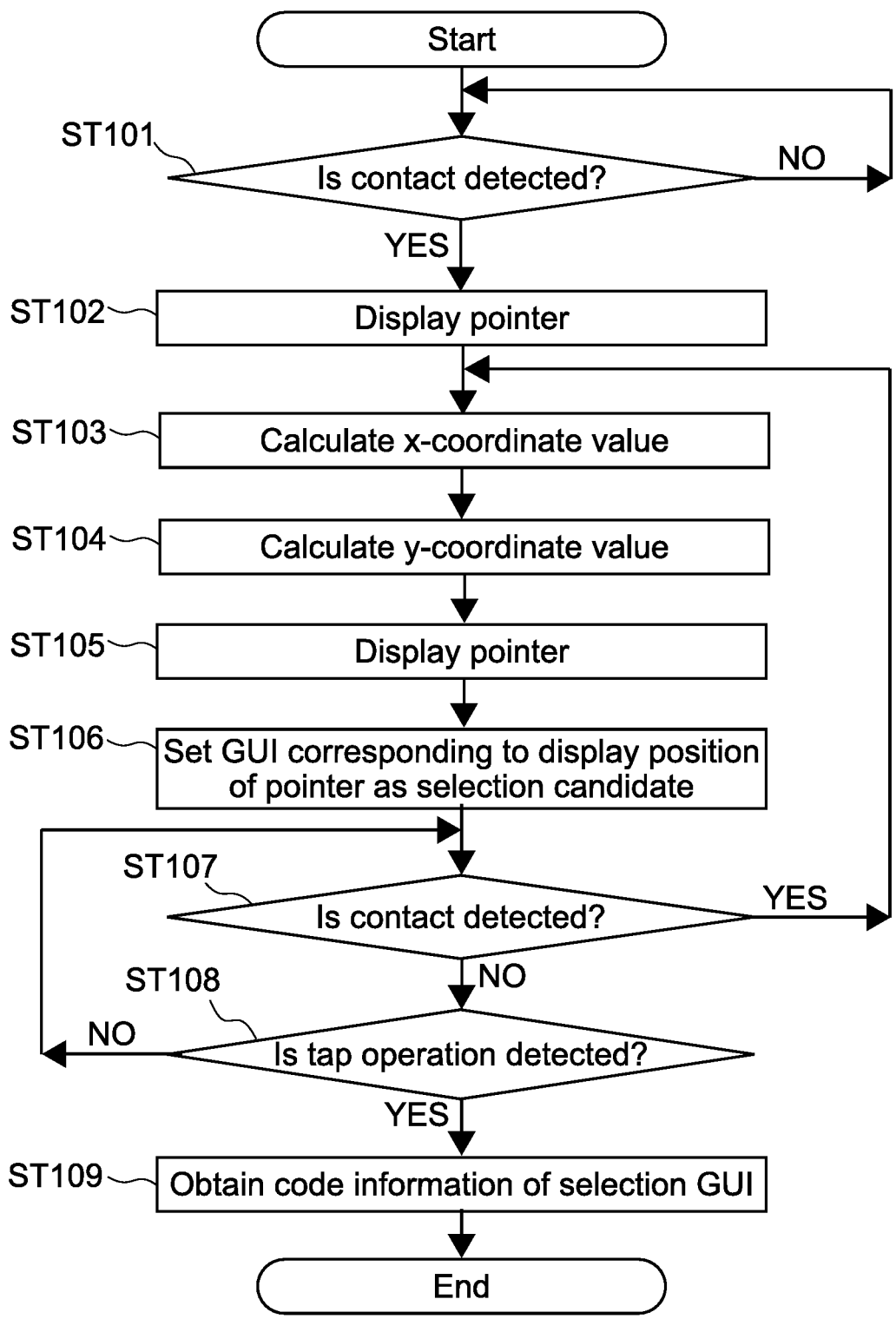
FIG. 5 is a flowchart in an operation example of the HMD shown in FIG. 1.
Figure 6:
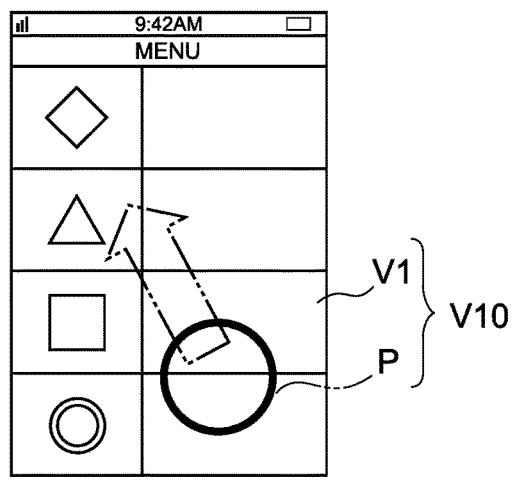
FIG. 6 is a view showing an example of an operation image presented to a user via a display unit shown in FIG. 1.

FIG. 5 is a flowchart in an operation example of the HMD 1 (control unit 33). Further, FIG. 6 is a view showing an example of an operation image to be presented to the user via the display surface 411a of the optical member 41. Here, an operation example of the HMD 1 that is performed when the user wears and starts the HMD 1 and performs a tap operation on the operation surface 311 is shown.

The started HMD 1 displays, for example, an image V1 in which a number of GUIs are displayed on the display surface 411a (cf. FIG. 6). The image V1 is, for example, a menu selection image of various settings of the HMD 1. The GUIs correspond to switching of the HMD 1 to a quiet mode, volume control, image reproduction, fast-forward, display mode change of pointer, and the like. That is, the input operation unit 3 is configured to be capable of changing the settings of the HMD 1 by the user selecting a particular one of the GUIs.

First, the HMD 1 is capable of performing initialization processing that erases information of detection positions calculated before and the like. Then, the first sensor 31 outputs a contact detection signal for detecting contact of the detection target to the control unit 33. The control unit 33 determines, according to the contact detection signal, a contact state between the operation surface 311 and the detection target (ST101).

If the contact of the detection target on the operation surface 311 is detected (YES in ST101), the signal generation unit 332 generates a signal for controlling an operation image V10 in which a pointer P is overlapped on the image V1, and displays the operation image V10 via the display surface 411a (ST102). A display position of the pointer P in the operation image V10 at this time is a predetermined initial display position. For example, an X-coordinate value and a Y-coordinate value may be both set to zero (almost center of image V1).

On the other hand, the arithmetic unit 331 is, for example, capable of setting a point on the xy-coordinates that corresponds to the initial display position as the initial detection position. This makes it possible to calculate the detection position with the point on the xy-coordinates at which contact is first detected being a reference. Specifically, in the case where the X-coordinate value and the Y-coordinate value of the initial display position are both zero, the x-coordinate value and the y-coordinate value of the initial detection position can be both set to zero.

Subsequently, the arithmetic unit 331 updates, based on a movement of the detection target along the x-axis direction, the x-coordinate value (ST103). Similarly, the arithmetic unit 331 updates, based on the rotation amount of the rotor 2, the y-coordinate value (ST104). The signal generation unit 332 displays the operation image V10 in which the pointer P overlaps at the display position on the image V1 corresponding to the updated detection position (ST105). With this, for example, as shown in FIG. 6, the pointer P can be moved up to the display position depending on a moving direction and a movement amount of the detection target from the initial display position.

The control unit 33 sets a GUI (hereinafter, will be referred to as selection GUI) corresponding to the display position of the pointer P as a selection candidate GUI (ST106). The selection candidate GUI may change, for example, a display mode including the color, intensity, luminescence, and the like of a frame of the image V10. Thus, the user can check the selection candidate GUI by viewing the image V10 displayed by the HMD 1.

The control unit 33 determines, according to an output from the first sensor 31, the contact state between the operation surface 311 and the detection target again (ST107). For example, if the contact state between the detection target and the operation surface 311 is maintained, there is a possibility that a drag operation (operation in which detection target moves while detection target is in contact with operation surface 311) is being performed.

Therefore, if it is determined that the contact state between the detection target and the operation surface 311 is maintained (YES in ST107), the arithmetic unit 331 is capable of updating, according to outputs from the first sensor 31 and the second sensor 32, the detection position again (ST102 and ST103). The signal generation unit 332 is capable of generating a control signal of the operation image V10 in which the pointer P has moved up to the display position corresponding to the updated detection position (ST104).

On the other hand, if a non-contact between the detection target and the operation surface 311 is determined (NO in ST107), the control unit 33 determines whether or not a tap operation is detected at the detection position corresponding to the selection candidate GUI (ST108). If contact and non-contact are continuously detected within a predetermined period of time, the control unit 33 is capable of determining that "the tap operation is detected."

If the tap operation is detected on the selection candidate GUI (YES in ST108), the control unit 33 determines the selection candidate GUI as the selection GUI. The control unit 33 obtains code information corresponding to the selection GUI that is stored in the storage unit 34 (ST109).

On the other hand, if the tap operation is not detected (NO in ST108), the control unit 33 determines that the selection candidate GUI is not selected. Then, the control unit 33 determines whether or not contact is detected again (ST107).

In addition, based on the obtained code information, the control unit 33 performs processing corresponding to the selection GUI. This processing is performed based on the program or the like stored in the storage unit 34. For example, in the case where the function corresponding to the selection GUI is "switching of the HMD 1 to a quiet mode," the control unit 33 is capable of switching the settings of the HMD 1 to the quiet mode by performing processing based on the code information corresponding to the GUI.

Further, in the case where the code information obtained in ST109 is, for example, a volume control, the control unit 33 is also capable of generating an image control signal based on the code information and outputting the image control signal to the display elements 42. This enables the HMD 1 to present a new operation image (not shown) on which, for example, a volume control bar is overlapped to the user. Further, in the case where the obtained code information is, for example, image reproduction, the control unit 33 generates an image control signal based on the code information. This enables the HMD 1 to present a thumbnail image or the like (not shown) for selecting video content to be reproduced to the user.

As in the above, in accordance with the HMD 1 according to this embodiment, an input operation becomes possible due to the rotor 2 installed into the temple unit 11 and a discrete input apparatus becomes unnecessary. Thus, it is possible to enhance the convenience in the case of carrying the HMD 1. In addition, according to the HMD 1, even in the case where it may be impossible to ensure a sufficient space in the y-axis direction, a two-dimensional input operation is possible. Hereinafter, an input operation in the y-axis direction will be described in detail.

Figure 7:
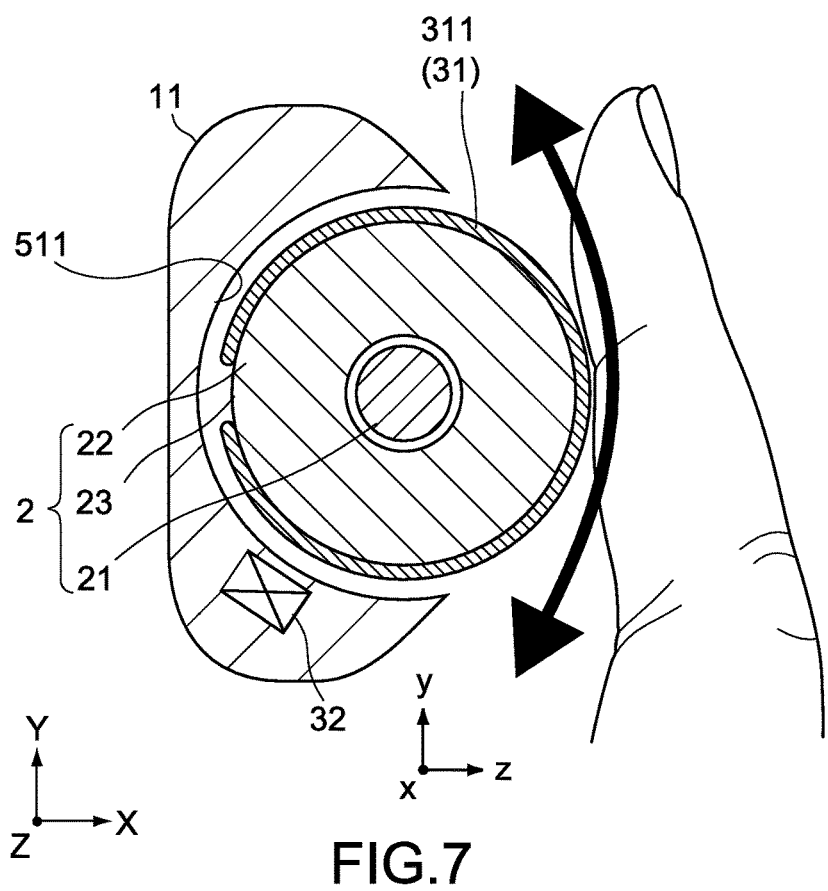
FIG. 7 is a schematic cross-sectional view showing a state in which the rotor shown in FIG. 1 rotates.

FIG. 7 is a schematic cross-sectional view showing a state in which the rotor 2 rotates around the x-axis by an input operation of the user in the y-axis direction.

For example, when the finger of the user moves in the y-axis direction while being held in contact with the operation surface 311, the rotor 2 provided with the operation surface 311 also rotates around the x-axis. With this, in the input operation unit 3, a displacement of the detection target in the y-axis direction and a rotation of the rotor 2 around the x-axis can be intuitively associated with each other.

Further, by the user intermittently rotating the rotor 2, it becomes possible to infinitely ensure a substantial operation area with respect to the y-axis direction. With this, for example, even if the operation image V10 (see FIG. 6) is long in the Y-axis direction, a scroll operation or the like in the Y-axis direction can be easily performed.

In addition, according to this embodiment, the operation in the x-axis direction is performed by the first sensor 31 being a touch sensor. Therefore, a tap operation, a drag operation, a flick operation, and the like that are specific to the touch sensor can be performed. Thus, it is possible to obtain a high operability like a two-dimensional touch sensor.

Further, the two-dimensional touch sensors widely used for a two-dimensional input operation need to ensure a plane area with a size in which the detection target can sufficiently move in view of the operability. Therefore, if the two-dimensional touch sensor is installed into the HMD 1, it is necessary to consider ensuring of the plane area and the design affected by the install of the two-dimensional touch sensor.

On the other hand, according to this embodiment, if the area in the longitudinal direction can be ensured, the two-dimensional operation becomes possible. Therefore, even in the case of the HMD 1 in which it is difficult to ensure the plane area for installing the two-dimensional touch sensor, the two-dimensional operation becomes possible without deteriorating the operational feeling and the design.

Further, the rotor 2 is provided to the temple unit 11, and hence an input operation can be performed without interfering with image display. In addition, the temple unit 11 is, in general, provided at a position of the hand of the user when the user wearing the HMD 1 crooks the arm upwards. Therefore, the user can perform an input operation in a comfortable position.

Further, according to this embodiment, the input operation unit 3 can be realized with a relatively simple configuration, and hence it is possible to provide the HMD 1 with a high endurance and at low costs. Further, a configuration easy to maintain the weight balance when the HMD is worn and when an input operation is performed can be achieved, and hence it is possible to provide the HMD 1 with good wearing comfort.

Second Embodiment

Figure 8:
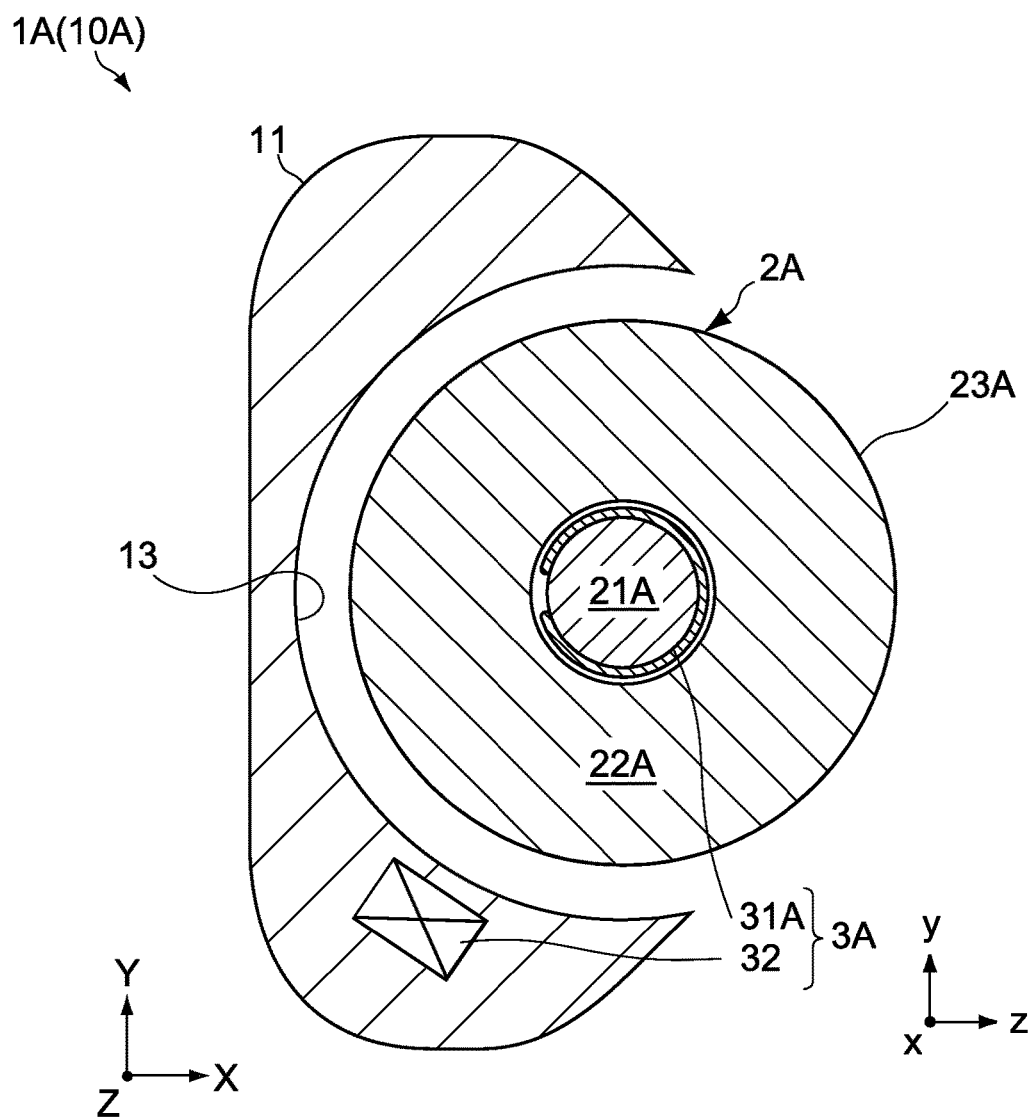
FIG. 8 is a schematic cross-sectional view as viewed from the Z-axis direction, which shows a configuration of a rotor according to a second embodiment of the present disclosure.
Figure 9:
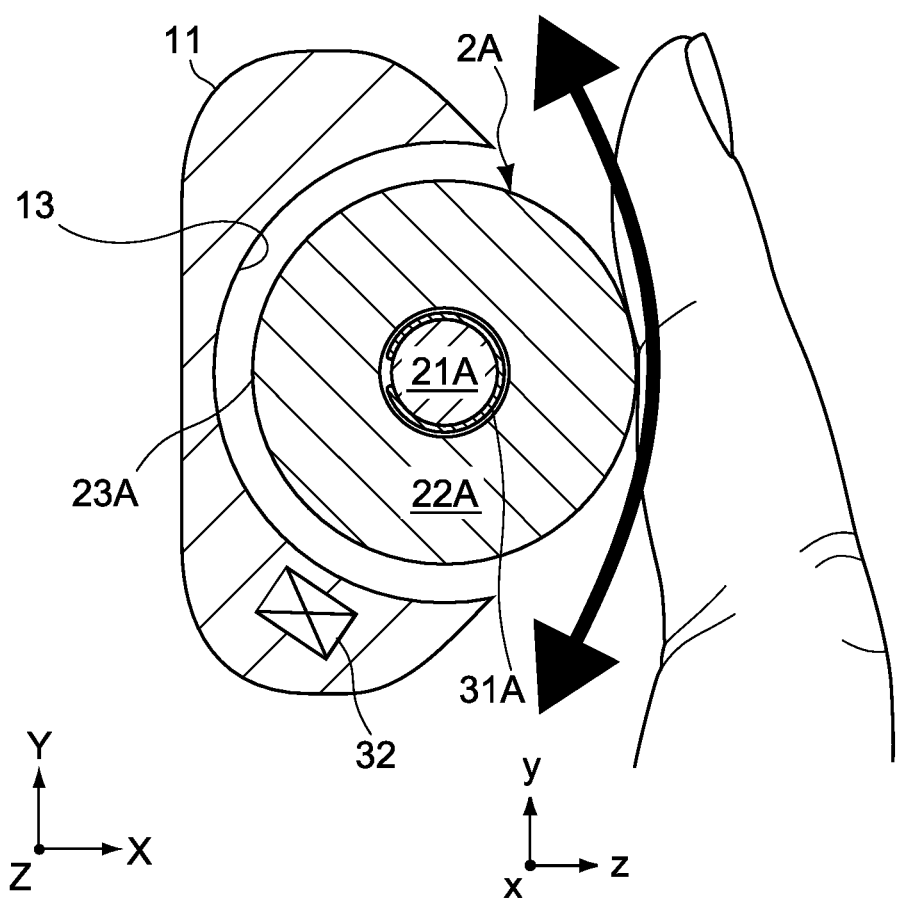
FIG. 9 is a schematic cross-sectional view as viewed from the Z-axis direction, which shows a state of the rotor shown in FIG. 8 upon input operation.

FIGS. 8 and 9 are a schematic cross-sectional view as viewed from the Z-axis direction, which shows a second embodiment of the present disclosure. FIG. 8 is a view showing a configuration of a rotor according to this embodiment. FIG. 9 is a view showing a state of the rotor upon input operation. Further, FIG. 8 corresponds to FIG. 4 according to the first embodiment and FIG. 9 corresponds to FIG. 7 according to the first embodiment. Note that portions corresponding to those of the above-mentioned first embodiment in the figures will be denoted by the same reference symbols.

An input operation unit 3A of an HMD 1A according to this embodiment is different particularly in the position of a first sensor 31A. Note that the configuration other than the first sensor 31A is the same as that of the first embodiment, and hence the description thereof will be simplified or omitted.

The rotor 2A has the same configuration as that of the rotor 2 according to the first embodiment as a whole. That is, the rotor 2A has a cylindrical shape having a longitudinal direction (height direction) in the x-axis direction as a whole and configured as a jog dial rotatable around the x-axis. Further, the rotor 2A includes a shaft portion 21A extending in the x-axis direction and a rotating portion 22A rotatable around the x-axis. A rotating surface 23A is formed on an outer surface of the rotating portion 22A.

In this embodiment, the shaft portion 21A is configured to be rotatable around the x-axis. Further, the rotating portion 22A is rotatable integrally with the shaft portion 21A. The shaft portion 21A and the rotating portion 22A are formed of, for example, insulating material.

Further, referring to FIG. 9, the rotor 2A is configured to be capable of being brought into contact with the detection target via the rotating surface 23A. The rotor 2A is capable of rotating around the x-axis, for example, when the detection target moves in the y-axis direction while being held in contact with the rotating surface 23A.

In this embodiment, the first sensor 31A is configured as a touch sensor that is provided between the shaft portion 21A and the rotating portion 22A of the rotor 2A and electrostatically detects the first operation along the x-axis direction. As in the first embodiment, the first sensor 31A is formed in, for example, an almost-rectangular sheet shape having flexibility and provided on the shaft portion 21A so as to cover almost an entire surface of the shaft portion 21A. This enables the first sensor 31A to also be capable of rotating around the x-axis integrally with the rotor 2A.

The first sensor 31A electrostatically detects the detection target held in contact with the rotating surface 23A via the rotating portion 22A. The rotating portion 22A is formed of an insulator, and hence the first sensor 31A is capable of detecting the detection target also via the rotating portion 22A.

The HMD 1A having the above-mentioned configuration yields actions and effects similar to those of the first embodiment. Thus, even in the case where it may be impossible to ensure a sufficient area in the y-axis direction, it is possible to provide the same operational feeling as that of the two-dimensional touch sensor. Further, it becomes possible to infinitely ensure a substantial operation area with respect to the y-axis direction.

In addition, unlike the first embodiment, the first sensor 31A is not exposed to the outside, and hence it is possible to reduce an external impact or the like to the first sensor 31A. This makes it possible to further improve the endurance of the HMD 1A.

Third Embodiment

Figure 10:
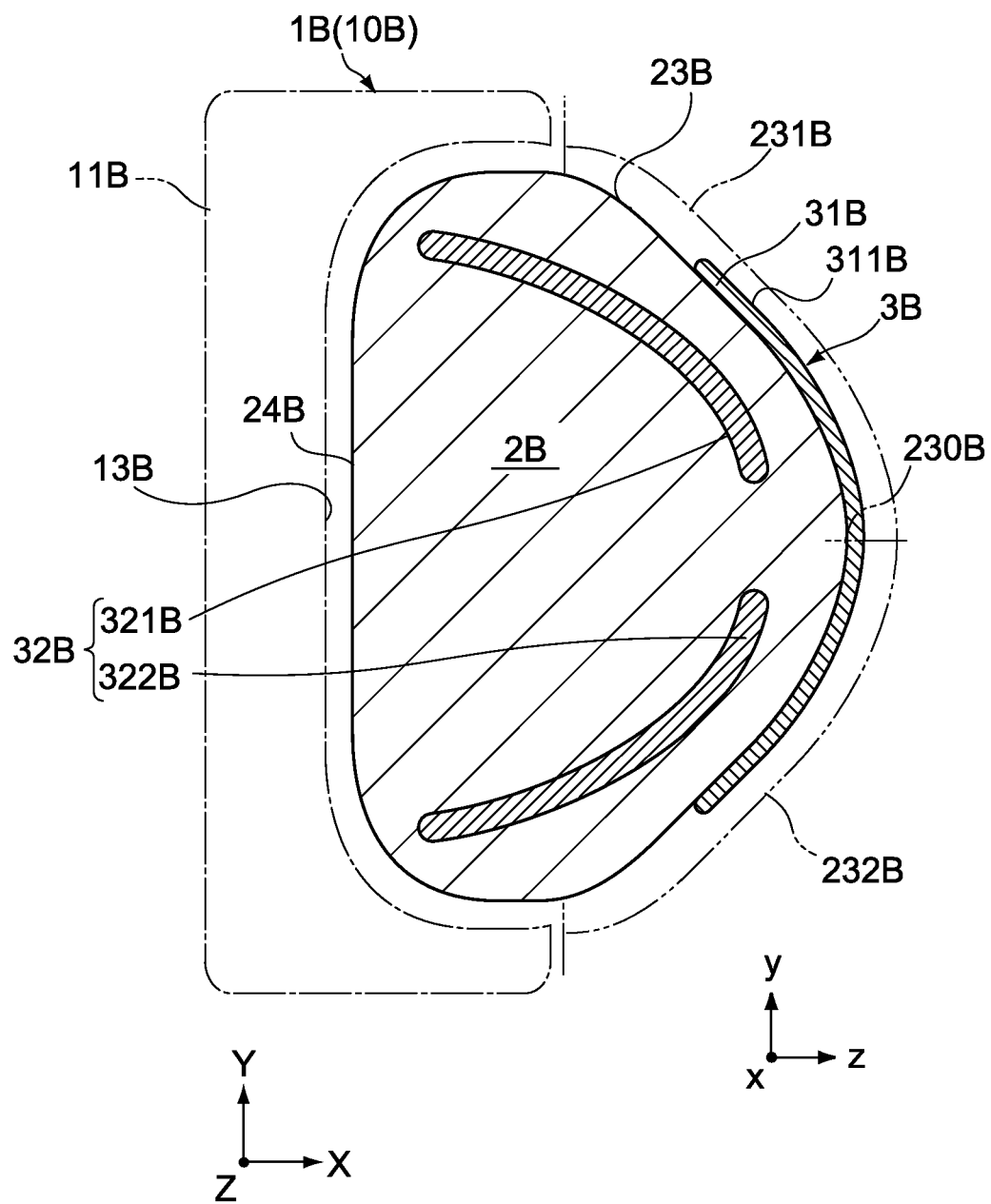
FIG. 10 is a schematic cross-sectional view as viewed from the Z-axis direction, which shows a configuration of an operating element according to a third embodiment of the present disclosure.
Figure 11:
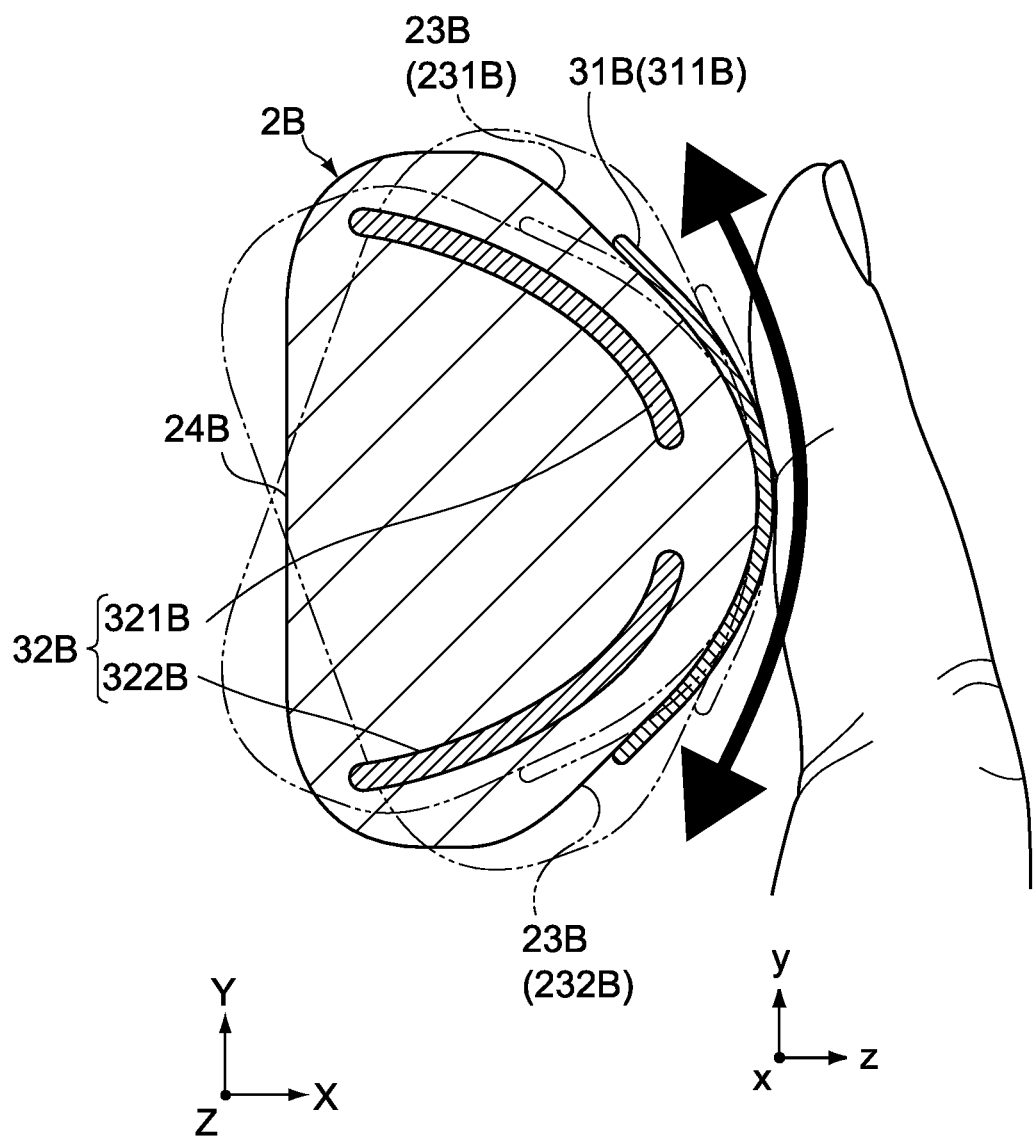
FIG. 11 is a schematic cross-sectional view as viewed from the Z-axis direction, which shows a state of the operating element shown in FIG. 10 upon input operation.

FIGS. 10 and 11 are schematic cross-sectional views as viewed from the Z-axis direction, which shows a third embodiment of the present disclosure. FIG. 10 is a view showing a configuration of an operating element according to this embodiment. FIG. 11 is a view showing a state of the operating element upon input operation. Further, FIG. 10 corresponds to FIG. 4 according to the first embodiment and FIG. 11 corresponds to FIG. 7 according to the first embodiment. Note that portions corresponding to those of the above-mentioned first embodiment in the figures will be denoted by the same reference symbols.

An HMD 1B according to this embodiment is different particularly in the configuration of an input operation unit 3B. Note that the other configurations are the same as those of the first embodiment, and hence the descriptions will be simplified or omitted.

The input operation unit 3B includes an elastic member (operating element) 2B, a first sensor 31B, a second sensor 32B, a control unit 33, and a storage unit 34. As will be described later, the input operation unit 3B according to this embodiment is largely different from the first embodiment in the configurations of the elastic member 2B and the second sensor 32B.

The elastic member 2B has a longitudinal direction in the x-axis direction and is configured to be strainable. The elastic member 2B is provided to a temple unit (support unit) 11B and may be provided in, for example, a groove portion 13B formed in the temple unit 11B. Note that, in FIG. 11, the illustration of the temple unit 11B is omitted.

The elastic member 2B includes an arrangement surface 24B and an input surface 23B. The arrangement surface 24B is a surface to be adjacent to the groove portion 13B (temple unit 11B) when the HMD is worn and formed to be almost orthogonal to the X-axis direction (z-axis direction). Note that the arrangement surface 24B may be provided in the groove portion 13B with a clearance. This makes it easy for the elastic member 2B to be elastically deformed upon input operation. On the other hand, the input surface 23B is opposed to the arrangement surface 24B in the z-axis direction. The input surface 23B is provided in almost the center with respect to the y-axis direction. The input surface 23B includes a top portion 230B formed along the x-axis direction. The input surface 23B is, for example, formed so as to bulge in the z-axis direction with the top portion 230B being a top.

The input surface 23B virtually includes a first area 231B and a second area 232B with the top portion 230B being a boundary (see dashed-two dotted lines in FIG. 10). It is assumed that the first area 231B is an area occupying from the top portion 230B to an upper portion on the y-axis direction with respect to the y-axis direction. It is assumed that the second area 232B is an area occupying from the top portion 230B to a lower portion on the y-axis direction with respect to the y-axis direction. The first area 231B and the second area 232B are tilted towards the arrangement surface 24B as going from the top portion 230B to upper and lower end portions of the elastic member 2B along the y-axis direction.

The first sensor 31B is configured as a one-dimensional projected capacitive sensor like the first sensor 31 according to the first embodiment. That is, the first sensor 31B is provided on the input surface 23B and electrostatically detects the first operation along the x-axis direction. In this embodiment, it is assumed that the "first operation" is, for example, an operation in which the detection target moves along the x-axis direction while being held in contact with the first sensor 31B. Further, the first sensor 31B includes an operation surface 311B with which the detection target can be held in contact, and is formed in, for example, an almost-rectangular sheet shape having flexibility. The first sensor 31B adheres onto the input surface 23B with an adhesive or the like. Thus, even when the elastic member 2B is deformed, it is possible to detect the first operation.

The second sensor 32B detects a second operation based on a strain of the elastic member 2B. In this embodiment, the "second operation" is an operation in which the detection target moves along the y-axis direction while being held in contact with the input surface 23B. In this embodiment, the second sensor 32B includes a first strain sensor 321B and a second strain sensor 322B. In this embodiment, the first strain sensor 321B and the second strain sensor 322B are both configured as strain gauges. The first strain sensor 321B and the second strain sensor 322B change in resistance value due to a strain, such that electrical outputs based on strain amounts can be performed.

The first strain sensor 321B and the second strain sensor 322B are provided to the elastic member 2B and arranged along the y-axis direction. The first strain sensor 321B and the second strain sensor 322B are arranged along the x-axis direction inside the elastic member 2B, for example. For example, the first strain sensor 321B is provided along the first area 231B and the second strain sensor 322B is provided along the second area 232B. Note that the number of strain sensors is not limited to two, and a plurality of strain sensors may be arranged in the x-axis direction, for example.

Referring to FIG. 11, the second operation according to this embodiment will be described in detail. The elastic member 2B strains in the y-axis direction depending on a movement of the detection target in the y-axis direction according to the second operation. Further, the first strain sensor 321B and the second strain sensor 322B are also provided inside the elastic member 2B, and hence strain due to a strain of the elastic member 2B.

Specifically, when the detection target moves upwards in the y-axis direction while being held in contact with the operation surface 311B, the first area 231B and the first strain sensor 321B are compressed and the second area 232B and the second strain sensor 322B are pulled. In contrast, when the detection target moves downwards in the y-axis direction while being held in contact with the operation surface 311B, the first area 231B and the first strain sensor 321B are pulled and the second area 232B and the second strain sensor 322B are compressed. This enables the first strain sensor 321B and the second strain sensor 322B to perform outputs depending on the movement amount and the moving direction of the detection target. Note that virtual lines of FIG. 11 are drawn exaggerating the elastic deformations of the elastic member 2B.

In this embodiment, the second sensor 32B may include a detection circuit (not shown) for outputting signals depending on change amounts of the resistance values of the first strain sensor 321B and the second strain sensor 322B. By employing a bridge (Wheatstone bridge) circuit, for example, a two active gauge method as such a detection circuit, it is possible to accurately detect strain amounts of the first strain sensor 321B and the second strain sensor 322B.

Based on outputs from the first sensor 31B and the second sensor 32B, the arithmetic unit 331 of the control unit 33 is capable of calculating a detection position. For example, the arithmetic unit 331 is capable of performing processing similar to that of the first embodiment based on the output from the first sensor 31B and performing an update or the like of the x-coordinate value of the detection target.

Further, based on outputs from the first strain sensor 321B and the second strain sensor 322B, the arithmetic unit 331 is capable of calculating a displacement amount of the y-coordinate value within a minute period of time. That is, the arithmetic unit 331 converts the outputs based on changes of the resistance values of the first strain sensor 321B and the second strain sensor 322B within a minute period of time into the displacement amount of the y-coordinate value. In addition, similar to the x-coordinate value, the y-coordinate value can be updated by integrating the displacement amount of the y-coordinate value.

Further, based on the processing result transmitted from the arithmetic unit 331, the signal generation unit 332 is capable of generating, for example, an image in which a pointer or the like moves based on the movement of the detection target.

According to this embodiment, as in the first embodiment, even in the case where it may be impossible to ensure a sufficient area in the y-axis direction, it is possible to provide an operational feeling similar to that of a two-dimensional touch sensor. Further, also with respect to the y-axis direction, similar to the x-axis direction, the HMD 1B performs an input operation by moving the detection target while being held in contact with the operation surface 311B. Thus, it is possible to provide an operational feeling more similar to that of the two-dimensional touch sensor.

Further, the plurality of gauges are used as the second sensor 32B, and hence it is possible to accurately detect the strain amount with a relatively simple configuration.

Fourth Embodiment

Figure 12:
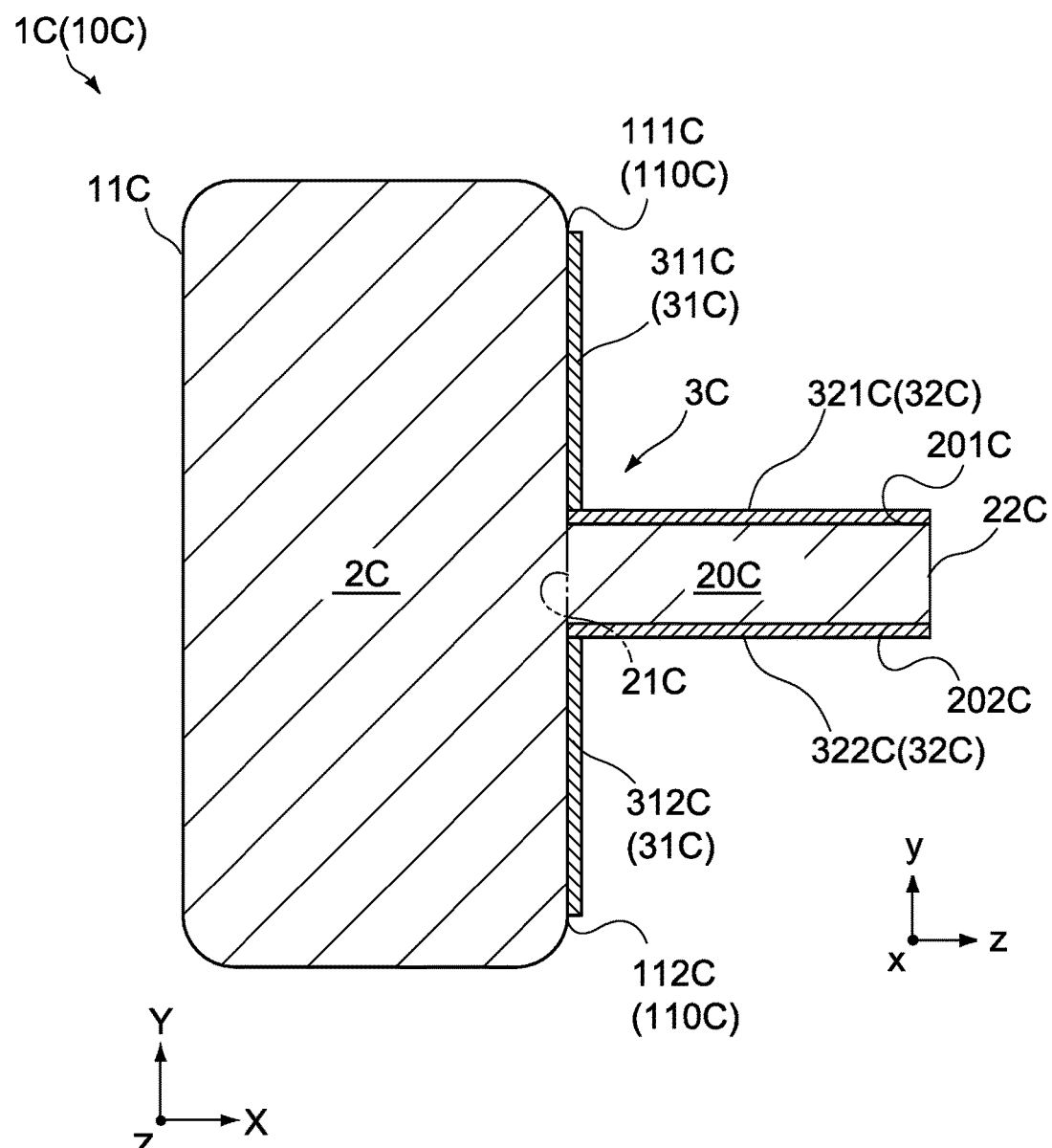
FIG. 12 is a schematic cross-sectional view as viewed from the Z-axis direction, which shows a configuration of an operating element according to a fourth embodiment of the present disclosure.
Figure 13:
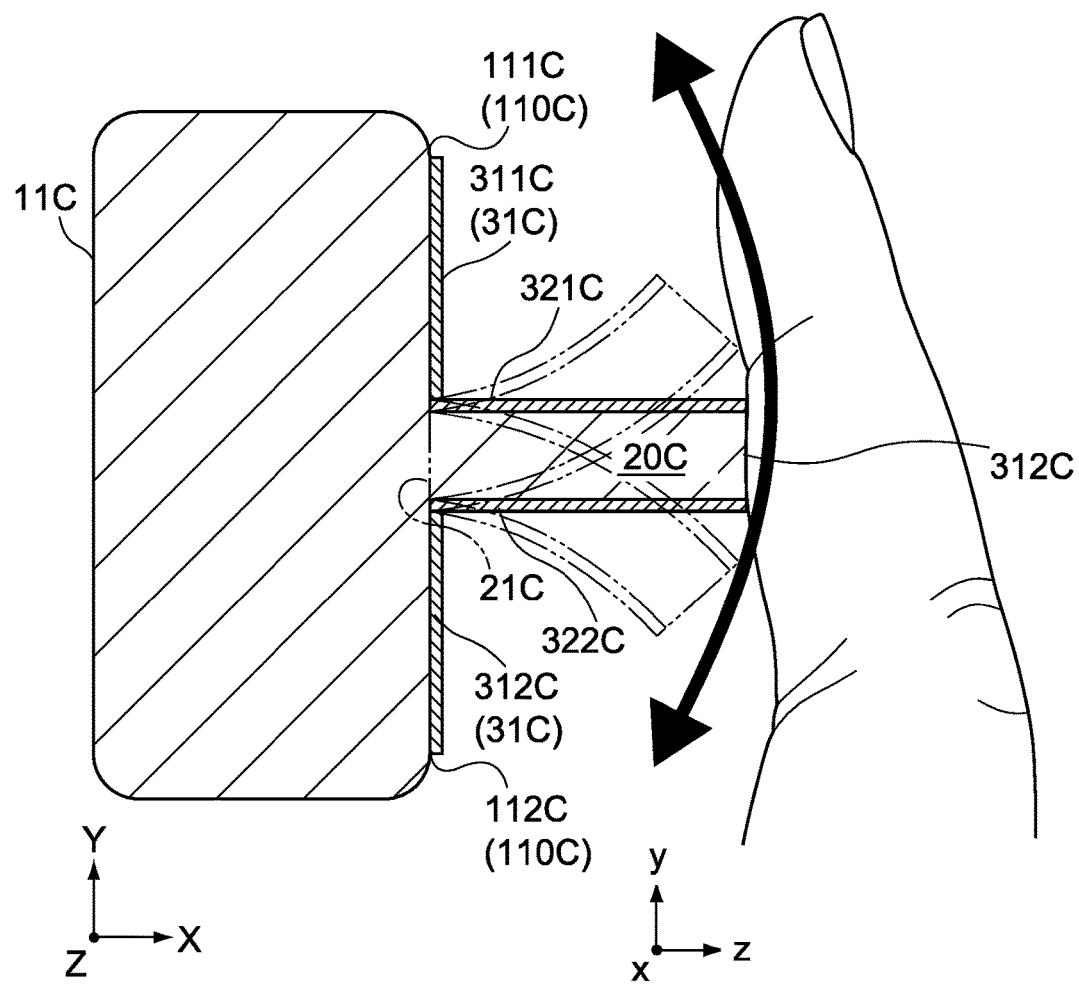
FIG. 13 is a schematic cross-sectional view as viewed from the Z-axis direction, which shows a state of the operating element shown in FIG. 12 upon input operation.

FIGS. 12 and 13 are schematic cross-sectional views as viewed from the Z-axis direction, which shows a fourth embodiment of the present disclosure. FIG. 12 is a view showing a configuration of an operating element according to this embodiment. FIG. 13 is a view showing a state of the operating element upon input operation in the y-axis direction. Further, FIG. 12 corresponds to FIG. 4 according to the first embodiment and FIG. 13 corresponds to FIG. 7 according to the first embodiment. Note that portions corresponding to those of the above-mentioned first embodiment in the figures will be denoted by the same reference symbols.

An HMD 1C according to this embodiment is different particularly in the configuration of an input operation unit 3C. Note that the configuration other than an input operation unit 3C is the same as that of the first embodiment, and hence the description thereof will be simplified or omitted.

In this embodiment, the input operation unit 3C includes an operating element 2C, a first sensor 31C, a second sensor 32C, a control unit 33, and a storage unit 34. In this embodiment, the input operation unit 3C is configured to be capable of detecting an operation in which the detection target moves in the x-axis direction and the y-axis direction while being held in contact with the operating element 2C.

The operating element 2C according to this embodiment includes a beam portion 20C. The operating element 2C is provided on a temple unit (support unit) 11C as in the first embodiment.

The beam portion 20C is a structure having an almost rectangular parallelepiped shape extending in the x-axis direction and projecting in the z-axis direction. The beam portion 20C includes a first end portion 21C and a second end portion 22C that are opposed to each other in the z-axis direction and an upper surface 201C and a lower surface 202C that are opposed to each other in the y-axis direction. The first end portion 21C is supported by an operation area 110C to be described later. The second end portion 22C is configured to be bendable in the y-axis direction. The beam portion 20C may be formed of, for example, elastic material. This makes the bending deformation of the second end portion 22C easy. Note that, in FIG. 12, the length of the beam portion 20C along the z-axis direction is exaggerated.

Further, in this embodiment, a main body 10C includes the operation area 110C. The operation area 110C is a rectangular flat surface formed in the temple unit 11C. The operation area 110C has a longitudinal direction in the x-axis direction and provided to be almost orthogonal to the z-axis direction. Further, in this embodiment, the operation area 110C supports the first end portion 21C of the beam portion 20C, which will be described later, along the x-axis direction. The operation area 110C includes a first area 111C and a second area 112C that are arranged in the y-axis direction while sandwiching the beam portion 20C therebetween. In this embodiment, the first area 111C and the second area 112C have almost the identical shape and area.

The first sensor 31C includes a first capacitive sensor 311C and a second capacitive sensor 312C each of which electrostatically detects the first operation along the x-axis direction. In this embodiment, the "first operation" is an operation in which the detection target moves along the x-axis direction while being held in contact with the second end portion 22C. A first capacitive sensor 311C and a second capacitive sensor 312C are each configured as an almost-rectangular one-dimensional projected capacitive sensor similar to the first sensor 31 according to the first embodiment. Further, the first capacitive sensor 311C is provided in the first area 111C of the operation area 110C and the second capacitive sensor 312C is provided in the second area 112C of the operation area 110C.

The second sensor 32C detects a second operation based on a bending amount of the beam portion 20C. In this embodiment, the "second operation" is an operation in which the detection target moves along the y-axis direction while being held in contact with the second end portion 22C. As in the third embodiment, the second sensor 32C includes a first strain sensor 321C and a second strain sensor 322C. In this embodiment, the first strain sensor 321C and the second strain sensor 322C are both configured as strain gauges. The first strain sensor 321C and the second strain sensor 322C change in resistance value due to a strain, such that electrical outputs based on strain amounts can be performed.

The first strain sensor 321C and the second strain sensor 322C each extend in the x-axis direction and are opposed to each other in the y-axis direction. For example, the first strain sensor 321C is provided on the upper surface 201C. On the other hand, the second strain sensor 322C is provided on the lower surface 202C. The first strain sensor 321C and the second strain sensor 322C change in the magnitude of the resistance value depending on a strain. Note that the number of strain sensors is not limited to two and, for example, a plurality of strain sensors may be arranged in the x-axis direction.

Referring to FIG. 13, the second operation according to this embodiment will be described in detail. The beam portion 20C strains in the y-axis direction depending on a movement of the detection target in the y-axis direction due to the second operation. Further, the first strain sensor 321C and the second strain sensor 322C are provided also on the upper surface 201C and the lower surface 202C, respectively, and hence strain due to a strain of the beam portion 20C.

Specifically, when the detection target moves upwards in the y-axis direction while being held in contact with the second end portion 22C, the upper surface 201C and the first strain sensor 321C are compressed and the lower surface 202C and the second strain sensor 322C are pulled. On the other hand, when the detection target moves downwards in the y-axis direction while being held in contact with the second end portion 22C, the upper surface 201C and the first strain sensor 321C are pulled and the lower surface 202C and the second strain sensor 322C are compressed. Note that virtual lines of FIG. 13 are drawn exaggerating the bending deformations of the beam portion 20C.

In this embodiment, the second sensor 32C may include a detection circuit (not shown) for outputting signals depending on change amounts of the resistance values of the first strain sensor 321C and the second strain sensor 322C. By employing a bridge (Wheatstone bridge) circuit, for example, a two active gauge method as such a detection circuit, it is possible to accurately detect strain amounts of the first strain sensor 321C and the second strain sensor 322C.

The arithmetic unit 331 of the control unit 33 is capable of calculating a detection position based on outputs of the first sensor 31C and the second sensor 32C.

Based on outputs of the first capacitive sensor 311C and a second capacitive sensor 312C included in the first sensor 31C, the arithmetic unit 331 is capable of performing an update or the like of the x-coordinate value of the detection target. The arithmetic unit 331 according to this embodiment is configured to be capable of detecting not only the operation held in direct contact with the first capacitive sensor 311C and a second capacitive sensor 312C, but also the state in which the detection target is held in contact with the second end portion 22C of the beam portion 20C. This makes it possible to perform both of input operations in the x-axis direction and the y-axis direction by the detection target moving while being held in contact with the second end portion 22C.

Further, the arithmetic unit 331 is capable of, for example, combining signals output from the first capacitive sensor 311C and the second capacitive sensor 2312C and performing processing of those signals as a single signal output from the first sensor 31C. With this, based on the outputs of the first capacitive sensor 311C and the second capacitive sensor 312C, an x-coordinate value of the detection target can be defined as a single value.

On the other hand, based on the outputs of the first strain sensor 321C and the second strain sensor 322C included in the second sensor 32C, the arithmetic unit 331 is capable of calculating the displacement amount of the y-coordinate value within a minute period of time. That is, the arithmetic unit 331 converts outputs based on changes of the resistance values of the first strain sensor 321C and the second strain sensor 322C within a minute period of time into the displacement amount of the y-coordinate value. In addition, similar to the x-coordinate value, the y-coordinate value can be updated by integrating the displacement amount of the y-coordinate value.

Further, based on the processing result transmitted from the arithmetic unit 331, the signal generation unit 332 is capable of generating, for example, an image in which a pointer or the like moves based on a movement of the detection target.

According to this embodiment, as in the first to third embodiments, even in the case where it may be impossible to ensure a sufficient area in the y-axis direction, it is possible to provide an operational feeling similar to that of a two-dimensional touch sensor. Further, as in the x-axis direction, also with respect to the y-axis direction, the HMD 1C performs an input operation by moving the detection target while being held in contact with the second end portion 22C. Thus, it is possible to provide an operational feeling more similar to that of the two-dimensional touch sensor. Further, the plurality of gauges are used as the second sensor 32C, and hence it is possible to accurately detect the strain amount with a relatively simple configuration.

Fifth Embodiment

Figure 14:
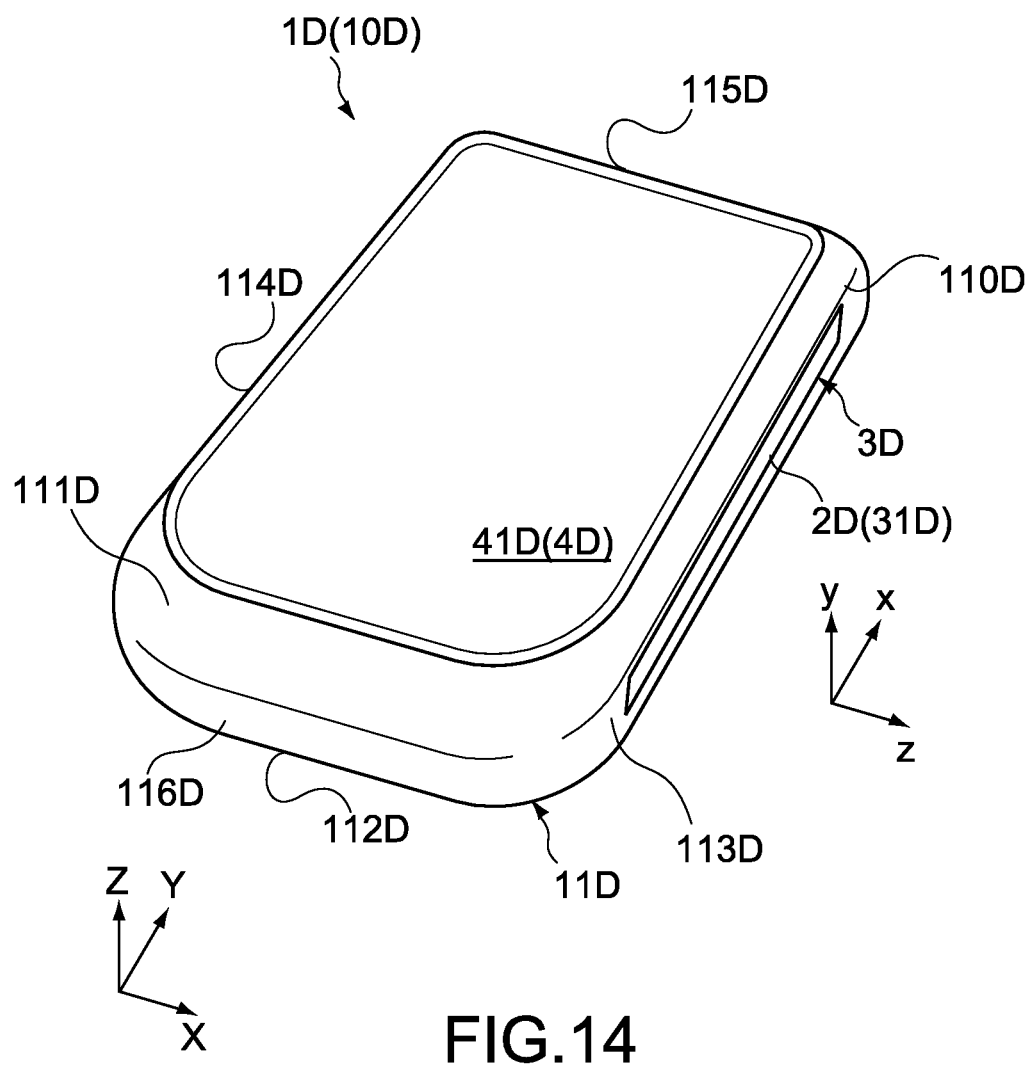
FIG. 14 is a perspective view showing a configuration of a display apparatus according to a fifth embodiment of the present disclosure.

FIG. 14 is a view showing a fifth embodiment according to the present disclosure, which is a perspective view showing a configuration of a display apparatus according to this embodiment. Note that portions corresponding to those of the above-mentioned first embodiment in the figures will be denoted by the same reference symbols.

Note that an X-axis direction and a Y-axis direction in the figures indicate directions almost orthogonal to each other, and indicate directions parallel to a display surface on which an image is displayed to a user in this embodiment. A Z-axis direction indicates a direction orthogonal to the X-axis direction and the Y-axis direction. Further, an x-axis direction, a y-axis direction, and a z-axis direction in the figures indicate three axis directions orthogonal to each other and correspond to the Y-axis direction, the Z-axis direction, and the X-axis direction, respectively. That is, in this embodiment, a direction of a first axis corresponds to the x-axis direction (Y-axis direction) and a direction of a second axis corresponds to the y-axis direction (Z-axis direction).

A display apparatus 1D according to this embodiment includes a main body 10D and an input operation unit 3D. The main body 10D is constituted of, for example, a compact and thin portable terminal. As will be described later, the input operation unit 3D has the same configuration as that of the input operation unit 3 according to the first embodiment. Note that the description of the same configuration as that of the first embodiment will be simplified or omitted.

The main body 10D includes a casing 11D and a display unit 4D. The casing 11D has a size that can be gripped by the user, for example. For example, the casing 11D is formed in an almost rectangular parallelepiped shape having a longitudinal direction (vertical direction) in the Y-axis direction (x-axis direction), a short direction (horizontal direction) in the X-axis direction (z-axis direction), and a thickness direction in the Z-axis direction (y-axis direction).

For example, the casing 11D includes a top surface 111D and a back surface 112D that are opposed to each other in the Z-axis direction, a side surface 113D and a side surface 114D that are opposed to each other in the X-axis direction, and a side surface 115D and a side surface 116D that are opposed to each other in the Y-axis direction. Regarding the casing 11D, marginal portions are formed in areas in which the surfaces 111D to 116D are adjacent to one another. In this embodiment, the marginal portion formed by the top surface 111D and the side surface 113D will be referred to as a marginal portion 110D. The marginal portion 110D is formed along the Y-axis direction (x-axis direction).

The display unit 4D includes a display surface 41D and a display element 42, and is configured to display an image.

The display element 42 may have a configuration almost identical to that of the display element 42 according to the first embodiment. The display element 42 is formed of, for example, a liquid-crystal display (LCD) element that emits image light. The display element 42 emits image light toward the display surface 41D.

The display surface 41D is provided to the casing 11D and configured as a display that emits image light generated by the display element 42. The display surface 41D may be provided on, for example, the top surface 111D of the casing 11D and configured to emit image light in the Z-axis direction. Note that the display surface 41D may be a touch panel display installing a touch sensor or may be a display without the touch sensor.

The input operation unit 3D has a configuration similar to that of the input operation unit 3 according to the first embodiment. That is, the input operation unit 3D includes a rotor (operating element) 2D, a first sensor (first detection element) 31D, a second sensor (second detection element) 32, a control unit 33, and a storage unit 34, and is provided to the main body 10D. The input operation unit 3D is capable of electrostatically detecting an operation on a rotor 2D along the x-axis direction and detecting an operation on the rotor 2D along the y-axis direction.

The rotor 2D has a longitudinal direction in the x-axis direction and is configured as a wide jog dial rotatable around the x-axis.

As in the first embodiment, the first sensor 31D is provided on the rotor 2D and electrostatically detects the first operation along the x-axis direction.

As in the first embodiment, the second sensor 32 detects the second operation based on a rotation of the rotor 2D around the x-axis.

As in the first embodiment, the control unit 33 calculates a detection position based on outputs of the first sensor 31D and the second sensor 32 and controls an image to be displayed on the display surface 41D.

The display apparatus 1D having the above-mentioned configuration yields actions and effects similar to those of the first embodiment. That is, even in the case where it may be impossible to ensure a sufficient area in the y-axis direction, it is possible to provide an operational feeling similar to that of a two-dimensional touch sensor. Further, it becomes possible to infinitely ensure a substantial operation area with respect to the y-axis direction.

Further, in a portable terminal including a touch panel display or the like, an input operation has to be performed on a display in which an image is displayed, for example.

Therefore, there is a fear that it interferes with viewing of images. However, there is a strong demand for miniaturization in the portable terminal, and hence it is difficult to ensure an area in which the two-dimensional touch sensor is provided, other than the area of the display. In view of this, according to this embodiment, it becomes possible to provide a display apparatus capable of performing the two-dimensional operation utilizing the marginal portion even in the case where the display apparatus is compact and thin. Thus, it is possible to comfortably perform the two-dimensional operation without interfering with viewing of images.

Sixth Embodiment

Figure 15:
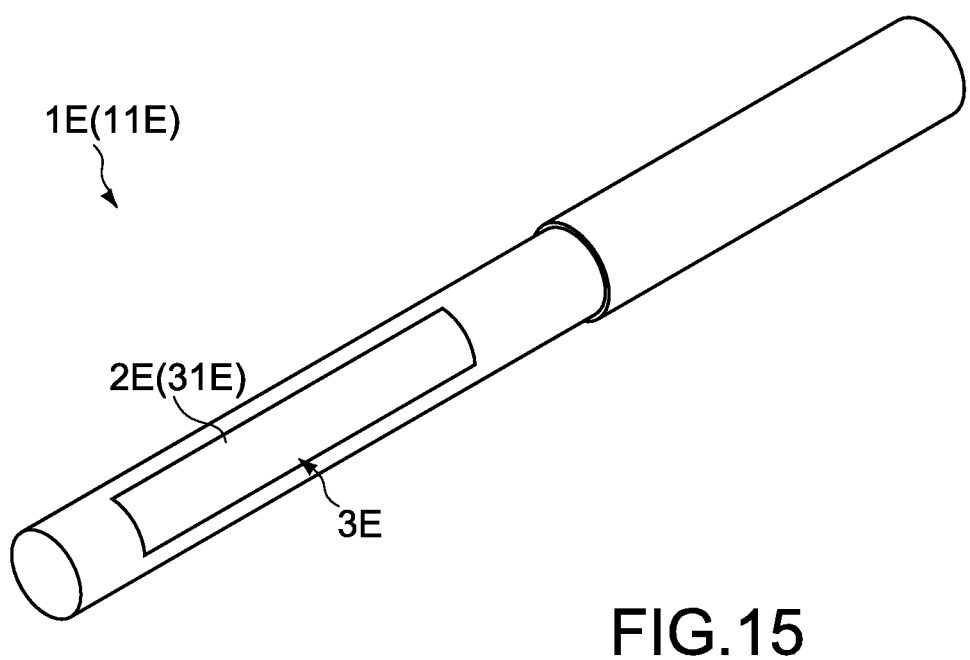
FIG. 15 is a perspective view showing a configuration of an input apparatus according to a sixth embodiment of the present disclosure.
Figure 15:
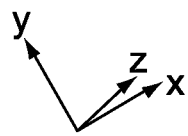
Figure 16:
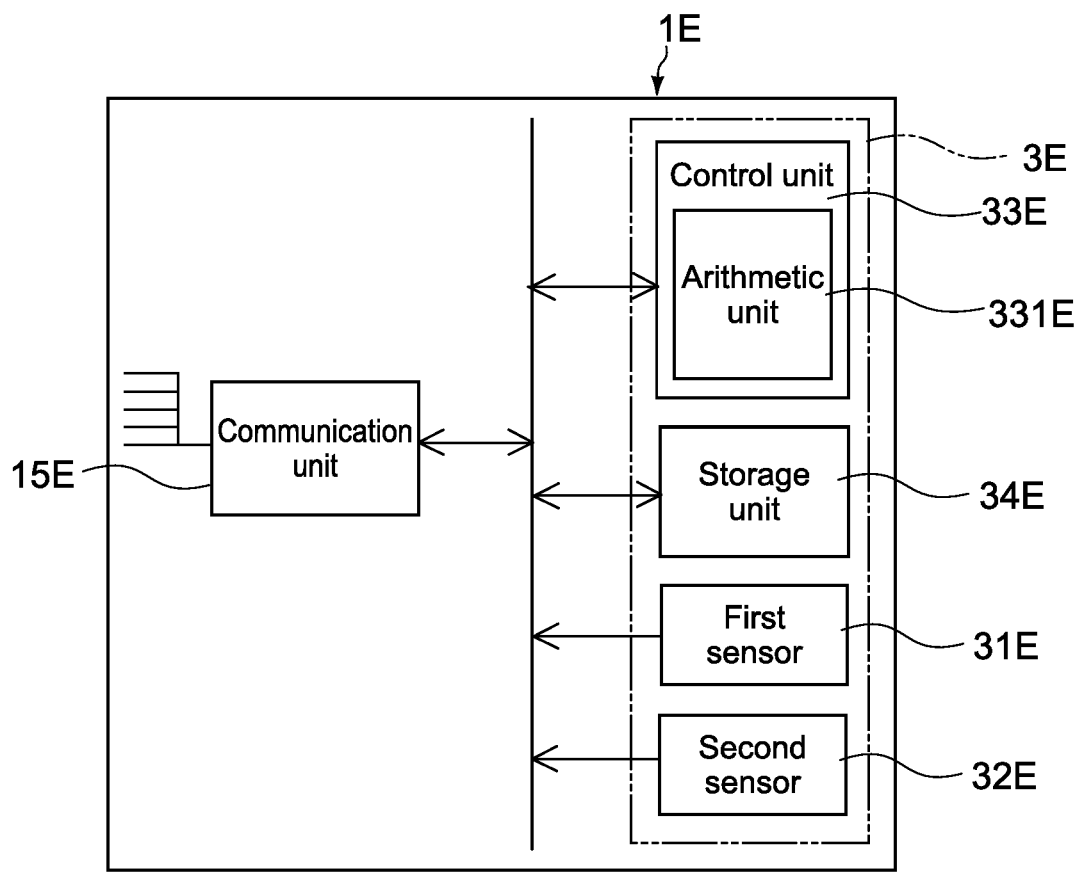
FIG. 16 is a block diagram showing an internal configuration of the input apparatus shown in FIG. 15.

FIGS. 15 and 16 are views showing a sixth embodiment according to the present disclosure. FIG. 15 is a perspective view showing a configuration of an input apparatus according to this embodiment. FIG. 16 is a block diagram showing an internal configuration. Note that portions corresponding to those of the above-mentioned first embodiment in the figures will be denoted by the same reference symbols.

Note that an x-axis direction, a y-axis direction, and a z-axis direction in the figures indicate three axis directions orthogonal to each other. A direction of a first axis corresponds to the x-axis direction and a direction of a second axis corresponds to the y-axis direction.

An input apparatus 1E according to this embodiment includes a casing 11E, an input operation unit 3E, and a communication unit 15E. The input apparatus 1E is constituted of, for example, a remote controller capable of performing an input operation of an electronic apparatus (not shown) such as a computer. Note that the description of the same configuration as that of the first embodiment will be simplified or omitted.

The casing 11E has a longitudinal direction in the x-axis direction and is formed in, for example, an almost cylindrical shape having a size that can be gripped by the user. Note that the shape of the casing 11E is not limited thereto as long as the longitudinal direction is the x-axis direction. For example, the shape of the casing 11E may be a prismatic shape, a pyramidal shape, or another shape.

The input operation unit 3E has a configuration similar to the input operation unit 3 according to the first embodiment. The input operation unit 3E includes a first sensor (first detection element) 31E, a second sensor (second detection element) 32E, a control unit 33E, and a storage unit 34E, and is provided to the casing 11E. The input operation unit 3E electrostatically detects an operation on a rotor 2E along the x-axis direction and is capable of detecting an operation on the rotor 2E along the y-axis direction. Note that, whole or part of the control unit 33E and the storage unit 34E may be installed into an electronic apparatus or the like to which the input apparatus 1E is connected.

The rotor 2E has a longitudinal direction in the x-axis direction and is configured as a wide jog dial rotatable around the x-axis.

As in the first embodiment, the first sensor 31E is provided on the rotor 2E and electrostatically detects a first operation along the x-axis direction.

As in the first embodiment, the second sensor 32 detects a second operation based on a rotation around the x-axis of the rotor 2E.

In this embodiment, the control unit 33E includes an arithmetic unit 331E. The arithmetic unit 331E calculates a detection position based on outputs of the first sensor 31E and the second sensor 32E. In addition, the control unit 33E outputs a detection signal thereof to the communication unit 15E.

As in the first embodiment, the storage unit 34E is constituted of various memories and the like. The storage unit 34E stores calculated detection positions, programs to be used for various arithmetic operations by the control unit 33E, and the like.

The communication unit 15E is configured to be capable of transmitting a detection signal generated by the control unit 33E to an electronic apparatus. Further, the communication unit 15E may be capable of receiving a signal from an electronic apparatus. Although the communication unit 15E is configured to be capable of wirelessly transmitting and receiving a signal, the communication unit 15E may be capable of performing wired transmission and reception.

An electronic apparatus connected to the communication unit 15E is capable of controlling, for example, based on a detection signal output from the input apparatus 1E, a position of a pointer or the like on a display.

According to the HMD 1E having the above-mentioned configuration, it is possible to yield actions and effects similar to those of the first embodiment. That is, even in the case where it may be impossible to ensure a sufficient area in the y-axis direction, it is possible to provide an operational feeling similar to that of a two-dimensional touch sensor, a mouse, and the like. Further, it becomes possible to infinitely ensure a substantial operation area with respect to the y-axis direction.

Although the embodiments of the present disclosure have been described above, the present disclosure is not limited thereto and may be variously modified based on the technical concept of the present disclosure.

In each of the above-mentioned embodiments, the determination of the selection GUI is performed by the tap operation. However, the present disclosure is not limited thereto. For example, the input operation unit may include a switch provided on the operating element or adjacent to the operating element and be configured to determine the selection GUI due to a depress operation or the like of the switch.

Alternatively, the selection GUI may be determined by an operation of pushing-in the operation surface or the input surface in an almost perpendicular direction with respect to the surface. Although the detection method of the push-in operation is not particularly limited, for example, a pressure-sensitive sensor or the like having an operation surface or an input surface below which an input operation unit is provided may be further provided and may be configured to be capable of detecting the push-in operation. Further, in the first, second, fifth, or sixth embodiment, the entire rotor is configured to be capable of being pushed-in in the z-axis direction and the push-in operation may be detectable by a mechanical click mechanism formed in continuous with the rotation shaft, for example (see Japanese Patent Application Laid-open No. 2002-099380, for example). Further, in the third or fourth embodiment, the push-in operation may be detectable based on the outputs of the strain sensors.

In the above-mentioned embodiments, only the first operation is electrostatically detected. However, the present disclosure is not limited thereto. For example, in the case where a capacitive sensor configured as a two-dimensional touch sensor is provided on the rotor, the second operation may also be electrostatically detected.

In the fifth and sixth embodiments, the input operation units 3D and 3E have the same configuration as that of the input operation unit 3 according to the first embodiment. However, the present disclosure is not limited thereto. For example, the input operation units 3D and 3E may have the same configuration as that of any one of the input operation unit 3A, the input operation unit 3B, and the input operation unit 3C according to the second to fourth embodiments. By setting the input operation units 3D and 3E to have the same configuration as the input operation unit 3A according to the second embodiment, the first sensor 31A is not exposed to the outside, and hence it becomes possible to reduce an external impact or the like to the first sensor 31A in addition to the above-mentioned actions and effects. By setting the input operation units 3B and 3C according to the third and fourth embodiments to have the same configurations as the input operation units 3D and 3E, it becomes possible to provide an operational feeling more similar to the two-dimensional touch sensor in addition to the above-mentioned actions and effects. Further, it becomes possible to accurately detect the second operation with a relatively simple configuration.

Further, in the third and fourth embodiments, the second sensor includes the strain gauge. However, the strain gauge may be replaced by another strain sensor. For example, the second sensor may include a pressure-sensitive conductive rubber. The pressure-sensitive conductive rubber is material obtained by doping an insulating polymer such as a silicone resin with conductive particles, and changes in resistance value when pressure is applied thereto. This makes it possible to detect a strain amount. Further, other well-known strain sensors such as a pressure-sensitive element, an acceleration sensor, a polymer actuator element, and an ultrasonic transceiver may also be used.

Although, in each of the first to fourth embodiments, the operating element is provided to the temple unit of the HMD, the present disclosure is not limited thereto. For example, the operating element may be provided to the rim portion or the like.

In the fifth embodiment, the display apparatus is not limited to the portable terminal and may be another electronic apparatus including a linear portion or stick-like portion. For example, the display apparatus may be a portable music player or the like including a display surface.

Although, in each of the above-mentioned embodiments, the first sensor is the projected capacitive sensor, the first sensor is not limited thereto. For example, the first sensor may be a surface capacitive sensor.

Although, in the first embodiment, the shaft portion 21 is fixed, the shaft portion 21 may be rotatable. In the case where the shaft portion 21 is rotatable, the rotating portion 22 may be configured to be rotatable integrally with the shaft portion 21.

Note that the present disclosure may also take the following configurations.

(1) A head-mounted display, including:
a main body that includes a display unit configured to be capable of presenting an image to a user, and is configured to be mountable on a head of the user; and
an input operation unit that includes an operating element having a longitudinal direction in a direction of a first axis, is configured to be capable of electrostatically detecting a first operation on the operating element along the direction of the first axis and detecting a second operation on the operating element along a direction of a second axis orthogonal to the direction of the first axis, and is provided to the main body.

(2) The head-mounted display according to Item (1), in which
the input operation unit further includes
a first detection element configured to electrostatically detect the first operation, and
a second detection element configured to detect the second operation.

(3) The head-mounted display according to Item (2), in which
the operating element includes a rotor that extends in the direction of the first axis and is configured to be rotatable around the first axis,
the first detection element is provided on the rotor, and
the second detection element is configured to detect the second operation based on a rotation of the rotor.

(4) The head-mounted display according to Item (2), in which
the operating element is configured to be strainable, and
the second detection element is configured to detect the second operation based on a strain of the operating element.

(5) The head-mounted display according to Item (4), in which
the operating element is an elastic member,
the first detection element is provided to the elastic member, and
the second detection element includes a plurality of strain sensors that are provided to the elastic member and arranged along the direction of the second axis.

(6) The head-mounted display according to Item (4), in which
the main body further includes an operation area in which the first detection element is provided,
the operating element includes a beam portion including
a first end portion that is supported by the operation area, and
a second end portion configured to be bendable in the direction of the second axis, and
the second detection element is configured to detect the second operation based on a bending amount of the beam portion.

(7) The head-mounted display according to any one of Items (2) to (6), in which
the input operation unit further includes a control unit configured to control the image based on an output of the first detection element and an output of the second detection element.

(8) The head-mounted display according to any one of Items (1) to (6), in which
the main body further includes a support unit that extends in the direction of the first axis and is mounted on a temporal region of the head of the user, and
the display unit and the operating element are supported by the support unit.

(9) A display apparatus, including:
a main body configured to be capable of displaying an image; and
an input operation unit that includes an operating element having a longitudinal direction in a direction of a first axis, is configured to be capable of electrostatically detecting an operation on the operating element along the direction of the first axis and detecting an operation on the operating element along a direction of a second axis orthogonal to the direction of the first axis, and is provided to the main body.

(10) The display apparatus according to Item (9), in which
the main body includes a casing including a marginal portion that extends in the direction of the first axis, and the operating element is provided along the marginal portion.

(11) An input apparatus, including:
a casing having a longitudinal direction in a direction of a first axis; and
an input operation unit that includes an operating element having a longitudinal direction in a direction of a first axis, is configured to be capable of electrostatically detecting an operation on the operating element along the direction of the first axis and detecting an operation on the operating element along a direction of a second axis orthogonal to the direction of the first axis, and is provided to the casing.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A head-mounted display, comprising:
a main body configured to be mountable on a head of a user,
wherein the main body comprises:
a display unit configured to present an image to the user; and
an input operation unit that includes an operating element having a longitudinal direction in a direction of a first axis, a first detection element and a second detection element,
wherein the first detection element is configured to electrostatically detect a first operation on the operating element along the direction of the first axis and wherein the second detection element is configured to detect a second operation on the operating element along a direction of a second axis orthogonal to the direction of the first axis,
wherein the operating element is configured to be strainable, and the second detection element is configured to detect the second operation based on a strain of the operating element,
wherein the second detection element in the operating element comprises at least two strain sensors, and
wherein, based on a determination that the operating element is strained, a first of the at least two strain sensors is compressed and a second of the at least two strain sensors is expanded.

2. The head-mounted display according to claim 1, wherein the operating element is an elastic member, the first detection element is provided to the elastic member, and the at least two strain sensors of the second detection element are provided to the elastic member and arranged along the direction of the second axis.

3. The head-mounted display according to claim 1, wherein
the main body further includes an operation area in which the first detection element is provided,
the operating element includes a beam portion including a first end portion that is supported by the operation area, and
a second end portion configured to be bendable in the direction of the second axis, and
the second detection element is further configured to detect the second operation based on a bending amount of the beam portion.

4. The head-mounted display according to claim 1, wherein the input operation unit further includes a control unit configured to control the image based on an output of the first detection element and an output of the second detection element.

5. The head-mounted display according to claim 1, wherein
the main body further includes a support unit that extends in the direction of the first axis and is mounted on a temporal region of the head of the user, and the display unit and the operating element are supported by the support unit.

6. A display apparatus, comprising:
a main body configured to display an image,
wherein the main body comprises:
an input operation unit that includes an operating element having a longitudinal direction in a direction of a first axis, a first detection element and a second detection element;
wherein the first detection element is configured to electrostatically detect a first operation on the operating element along the direction of the first axis and wherein the second detection element is configured to detect a second operation on the operating element along a direction of a second axis orthogonal to the direction of the first axis, and
wherein the operating element includes a rotor that extends in the direction of the first axis and is configured to be rotatable around the first axis, the first detection element is provided on the rotor, and the second detection element is configured to detect the second operation based on a rotation of the rotor.

7. The display apparatus according to claim 6, wherein
the main body further includes a casing including a marginal portion that extends in the direction of the first axis, and
the operating element is provided along the marginal portion.

8. An input apparatus, comprising:
a casing having a longitudinal direction in a direction of a first axis; and
an input operation unit, provided to the casing, that includes an operating element having a longitudinal direction in a direction of a first axis, a first detection element and a second detection element;
wherein the first detection element is configured to electrostatically detect a first operation on the operating element along the direction of the first axis and wherein the second detection element is configured to detect a second operation on the operating element along a direction of a second axis orthogonal to the direction of the first axis, and
wherein the operating element includes a rotor that extends in the direction of the first axis and is configured to be rotatable around the first axis, the first detection element is provided on the rotor, and the second detection element is configured to detect the second operation based on a rotation of the rotor.

9. A head-mounted display, comprising:
a main body that includes a display unit configured to be capable of presenting an image to a user, and is configured to be mountable on a head of the user; and
an input operation unit, provided to the main body, that includes an operating element having a longitudinal direction in a direction of a first axis, a first detection element and a second detection element;

wherein the first detection element is configured to electrostatically detect a first operation on the operating element along the direction of the first axis and wherein the second detection element is configured to detect a second operation on the operating element along a direction of a second axis orthogonal to the direction of the first axis, wherein the operating element includes a rotor that extends in the direction of the first axis and is configured to be rotatable around the first axis, the first detection element is provided on the rotor and the second detection element is configured to detect the second operation based on a rotation of the rotor.

10. The head-mounted display according to claim 9, wherein the input operation unit further includes a control unit configured to control the image based on an output of the first detection element and an output of the second detection element.

11. The head-mounted display according to claim 9, wherein the main body further includes a support unit that extends in the direction of the first axis and is mounted on a temporal region of the head of the user, wherein the display unit and the operating element are supported by the support unit.

* * * * *